United States Patent
Phillips

(10) Patent No.: US 11,753,882 B2
(45) Date of Patent: Sep. 12, 2023

(54) SYSTEM AND APPARATUS COMPRISING A GUIDE FOR A GRIPPING TOOL

(71) Applicant: William Thomas Phillips, Inc., Tyler, TX (US)

(72) Inventor: William Thomas Phillips, Tyler, TX (US)

(73) Assignee: William Thomas Phillips, Inc., Tyler, TX (US)

(*) Notice: Subject to any disclaimer, the term of this patent is extended or adjusted under 35 U.S.C. 154(b) by 0 days.

(21) Appl. No.: 16/924,406

(22) Filed: Jul. 9, 2020

(65) Prior Publication Data

US 2021/0213625 A1 Jul. 15, 2021

Related U.S. Application Data

(63) Continuation-in-part of application No. 16/800,437, filed on Feb. 25, 2020, now Pat. No. 11,401,758.

(60) Provisional application No. 62/959,871, filed on Jan. 10, 2020.

(51) Int. Cl.
E21B 19/24 (2006.01)

(52) U.S. Cl.
CPC .................. *E21B 19/24* (2013.01)

(58) Field of Classification Search
CPC .................. E21B 19/24; E21B 19/02–07
See application file for complete search history.

(56) References Cited

U.S. PATENT DOCUMENTS

| | | | |
|---|---|---|---|
| 2,279,118 A | 4/1942 | Fortune et al. | |
| 2,594,429 A | 4/1952 | Handley | |
| 2,681,821 A | 6/1954 | Medders | |
| 3,475,038 A * | 10/1969 | Lee | E21B 19/24 |
| | | | 285/27 |
| 3,662,842 A | 5/1972 | Bromell | |
| D413,126 S | 8/1999 | Warren et al. | |
| 7,909,120 B2 | 3/2011 | Slack | |
| 8,348,320 B2 | 1/2013 | Latiolais, Jr. et al. | |
| 8,454,066 B2 | 6/2013 | Slack | |

(Continued)

OTHER PUBLICATIONS

Nubbins believed to be manufactured according to API specifications and believed to be publicly available at least before Jan. 10, 2020.

(Continued)

*Primary Examiner* — Theodore N Yao
(74) *Attorney, Agent, or Firm* — Vincent J. Allen; Rouel F. Rothenberger, IV; Carstens, Allen & Gourley, LLP

(57) ABSTRACT

Apparatus, system and method for guiding a gripping tool into a structure to be gripped. In one aspect, the apparatus comprises a nubbin and a guide structure fixed to the nubbin. In a second aspect, the system comprises the apparatus and a target structure to be gripped by the gripping tool. In a third aspect, the method comprises coupling the nubbin to a target structure to be gripped by a gripping tool and moving a leading portion of the gripping tool through the apparatus and into the target structure. In a fourth aspect the apparatus comprises a guide structure configured to be fixed to a nubbin. In a fifth aspect the apparatus comprises coupling the nubbin to a target structure, coupling the guide structure to the nubbin and moving a leading portion of the gripping tool through the apparatus and into the target structure.

19 Claims, 22 Drawing Sheets

(56) References Cited

U.S. PATENT DOCUMENTS

| | | |
|---|---|---|
| D687,862 S | 8/2013 | Drenth |
| D694,281 S | 11/2013 | Frazier |
| D694,282 S | 11/2013 | Frazier |
| D698,370 S | 1/2014 | Frazier |
| D703,698 S | 4/2014 | Frazier |
| D783,133 S | 4/2017 | Fitzhugh et al. |
| D806,136 S | 12/2017 | Saulou et al. |
| D827,000 S | 8/2018 | VanLue |
| D882,641 S | 4/2020 | Moja et al. |
| D883,344 S | 5/2020 | Bleeker |
| 2007/0023190 A1 | 2/2007 | Hall et al. |
| 2009/0242192 A1 | 10/2009 | Jensen et al. |
| 2014/0083676 A1 | 3/2014 | Miner |
| 2014/0262335 A1 | 9/2014 | Bull |
| 2015/0322734 A1* | 11/2015 | Macdonald ........... E21B 17/043 166/241.5 |
| 2015/0354297 A1 | 12/2015 | Arp et al. |
| 2016/0153251 A1 | 6/2016 | Frith et al. |
| 2016/0222484 A1* | 8/2016 | Koyer ................... C21D 6/005 |
| 2017/0058647 A1* | 3/2017 | Langlais ................ E21B 17/04 |
| 2019/0368281 A1* | 12/2019 | Haggart ................. E21B 19/02 |

OTHER PUBLICATIONS

Doing More With Less, Volant Oil Tools (US) Inc., The tool of choice for operators with challenging casing runs. www.volantproducts.ca, 4 pgs.

Specification for Casing and Tubing, API Specification 5CT, Eighth Edition, Jul. 1, 2005, ISO 119:2004, 306 pgs.

\* cited by examiner

SYSTEM AND APPARATUS COMPRISING A GUIDE FOR A GRIPPING TOOL

CROSS-REFERENCE TO RELATED APPLICATIONS

This application claims priority to U.S. Nonprovisional application Ser. No. 16/800,437, filed Feb. 25, 2020, entitled "SYSTEM AND APPARATUS COMPRISING A GUIDE FOR A GRIPPING TOOL AND METHOD OF USING SAME," published as U.S. Publication No. 20210215008 on Jul. 15, 2021, which claims priority to U.S. Provisional Application No. 62/959,871, filed on Jan. 10, 2020, entitled "SYSTEM AND APPARATUS COMPRISING A GUIDE FOR A GRIPPING TOOL AND METHOD OF USING SAME." This application is also filed within one year of and claims priority to U.S. Provisional Application No. 62/959,871, filed on Jan. 10, 2020, entitled "SYSTEM AND APPARATUS COMPRISING A GUIDE FOR A GRIPPING TOOL AND METHOD OF USING SAME," and Each patent application and publication listed in this paragraph is hereby incorporated herein by reference in its entirety as an example.

BACKGROUND OF THE INVENTION

Technical Field

The present invention relates to an apparatus for guiding a gripping tool into a structure to be gripped. In one aspect, gripping tools include, without limitation, tools that are inserted into hollow or tubular structures and used to grip the hollow or tubular structures. Examples of gripping tools include casing running tools, which can be inserted into a pipe, casing, wellbore, or a combination thereof and which can be used in drilling a wellbore. Among other uses, casing running tools can be used to rotate and reciprocate casing and liner strings while drilling a well.

Additionally, the present invention relates to applications in which tubulars and strings of tubulars need to be (i) gripped, (ii) manipulated or handled and (iii) lifted or hoisted using a tool that is coupled or connected to a device such as reaction frame or a drive head to enable both torsional and axial loads to be transferred from or into a tubular segment that is gripped. Within the field of servicing wells, constructing wells and earth drilling with service and drilling rigs the present invention relates to slips (more specifically, to slips on rigs using top drives), and relates to tubular running tools that connect to a top drive for gripping a proximal portion of tubular strings that are being removed from, placed in, made use of in, or assembled into a well bore. Tubular running tools such as these support varied functions that are advantageous to or required for the operations described, including, but not limited to, rapid engagement, rapid release, rotating, pushing, lifting or hoisting, the flow of a pressurized fluid into a string of tubulars, and the flow of the pressurized fluid out of a string of tubulars. In some embodiments of tubular running tools, the gripping range of the tubular running tools is improved or extended through the provision of linkages. See U.S. Pat. Nos. 8,454,066 B2 and 7,909,120 B2, which are both incorporated herein by reference in their entireties as examples.

Description of Related Art

It is well known that wellbores can be used to explore for and extract substances from the Earth, including natural resources such as oil, gas, or water. However, drilling a wellbore can be costly and require specialized equipment and skilled operators. Over time, devices have been developed to make drilling more efficient, for example, tubulars and nubbins. Examples of tubulars and nubbins, along with their advantages and uses, are illustrated in U.S. Pat. No. 8,348,320 B2, issued Jan. 8, 2013, entitled "LOAD RING FOR LIFTING BY ELEVATOR, OF CASING HAVING NO UPSET," which is incorporated herein by reference in its entirety as an example.

The development of casing tools have also aided in decreasing costs and increasing the efficiency of drilling a wellbore and are also useful in other applications where tubulars and tubular strings must be gripped, handled and hoisted, as a person having ordinary skill in the art would understand upon reading this disclosure. Examples of the advantages and benefits provided by casing gripping tool are discussed, for example, in U.S. Pat. No. 8,454,066 B2, issued on Jun. 4, 2013, entitled "GRIP EXTENSION LINKAGE TO PROVIDE GRIPPING TOOL WITH IMPROVED OPERATIONAL RANGE, AND METHOD OF USE OF THE SAME," which patent is incorporated herein by reference in its entirety as an example, and which illustrates how gripping tools can be made and used. Further examples of gripping tools are provided in U.S. Pat. No. 7,909,120 B2, issued on Mar. 22, 2011, entitled "GRIPPING TOOL," which is incorporated herein by reference in its entirety as an example. As additional examples, gripping tools (also known as a casing running tools) are provided, for example, by Volant Oil Tools (US) Inc. having an office at 23571 Clay Road, Katy, Tex. 77449, United States. The casing running tools offered by Volant Oil Tools (US) Inc. are provided, for example, under the trade name CRTi® Casing Running Tools and CRTe® Casing Running Tools. As can be seen, gripping tools can be advantageously used to grip tubular structures, for example, the tubulars that can be used to drill wells.

Nonetheless, further advantages can be realized by using the apparatuses, systems or methods of the present disclosure. As non-exhaustive examples, some embodiments described herein can be used to reduce the skill, time, cost, or any combination thereof required to install a gripping tool in a target structure that is to be gripped. For example, in some embodiments, an apparatus of the present disclosure comprises a nubbin and a guide structure coupled to the nubbin, the guide structure being configured to guide a casing running tool into position in a pipe or casing for drilling a wellbore.

SUMMARY OF SELECTED EMBODIMENTS OF THE INVENTION

In accordance with a first embodiment, an apparatus for guiding a gripping tool into a target structure to be gripped is provided. The apparatus comprises a nubbin and a guide structure fixed to the nubbin. The nubbin comprises a proximal nubbin end configured to be adjacent to the target structure, a proximal nubbin portion adjacent to the proximal nubbin end, a distal nubbin end opposite the proximal nubbin end, and a distal nubbin portion adjacent to the distal nubbin end. The proximal nubbin portion comprises a nubbin coupling configured to be coupled to the target structure. The guide structure comprises a proximal guide end adjacent to the nubbin, a proximal guide portion adjacent to the proximal guide end, a distal guide end opposite the proximal guide end, a distal guide portion adjacent to the distal guide end, and an inner void having a cross-sectional dimension that increases from the proximal guide end to the distal guide end. The proximal guide portion is fixed to the distal nubbin portion.

In accordance with a second embodiment, a system is provided. The system comprises an apparatus for guiding a gripping tool into a target structure to be gripped and the target structure.

In accordance with a third embodiment, a method is provided for using an apparatus. The apparatus comprises a nubbin and a guide structure coupled to the nubbin. The method comprises several steps. A first step comprises coupling the nubbin to a target structure to be gripped by a gripping tool. A second step comprises moving a leading portion of the gripping tool through the apparatus and into the target structure.

In accordance with a fourth embodiment, an apparatus for guiding a gripping tool into a target structure to be gripped is provided. The apparatus comprises a guide structure configured to be fixed to a nubbin. The nubbin comprises a proximal nubbin end configured to be adjacent to the target structure, a proximal nubbin portion adjacent to the proximal nubbin end, a distal nubbin end opposite the proximal nubbin end, and a distal nubbin portion adjacent to the distal nubbin end. The proximal nubbin portion comprises a nubbin coupling configured to be coupled to the target structure. The distal nubbin portion comprises a nubbin collar, and the nubbin collar comprises a first nubbin aperture and a second nubbin aperture opposite the first nubbin aperture. The guide structure comprises a proximal guide end configured to be adjacent to the nubbin, a proximal guide portion adjacent to the proximal guide end, a distal guide end opposite the proximal guide end, and an inner void having a cross-sectional dimension that increases from the proximal guide end to the distal guide end. The proximal guide portion is configured to be fixed to the distal nubbin portion. The proximal guide portion of the guide structure comprises a guide collar, the guide collar configured to receive the nubbin collar of the nubbin. The guide collar comprises a first guide aperture and a second guide aperture opposite the first guide aperture, the first guide aperture and the second guide aperture each being configured to receive a cylindrical rod that passes through both the first guide aperture and the second guide aperture.

In accordance with a fifth embodiment, a method is provided for using an apparatus. The apparatus comprises a nubbin and a guide structure configured to be coupled to a nubbin. The method comprises coupling the nubbin to a target structure to be gripped by a gripping tool, coupling the guide structure to the nubbin, and moving a leading portion of the gripping tool through the apparatus and into the target structure.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

DETAILED DESCRIPTION

Figure 1:
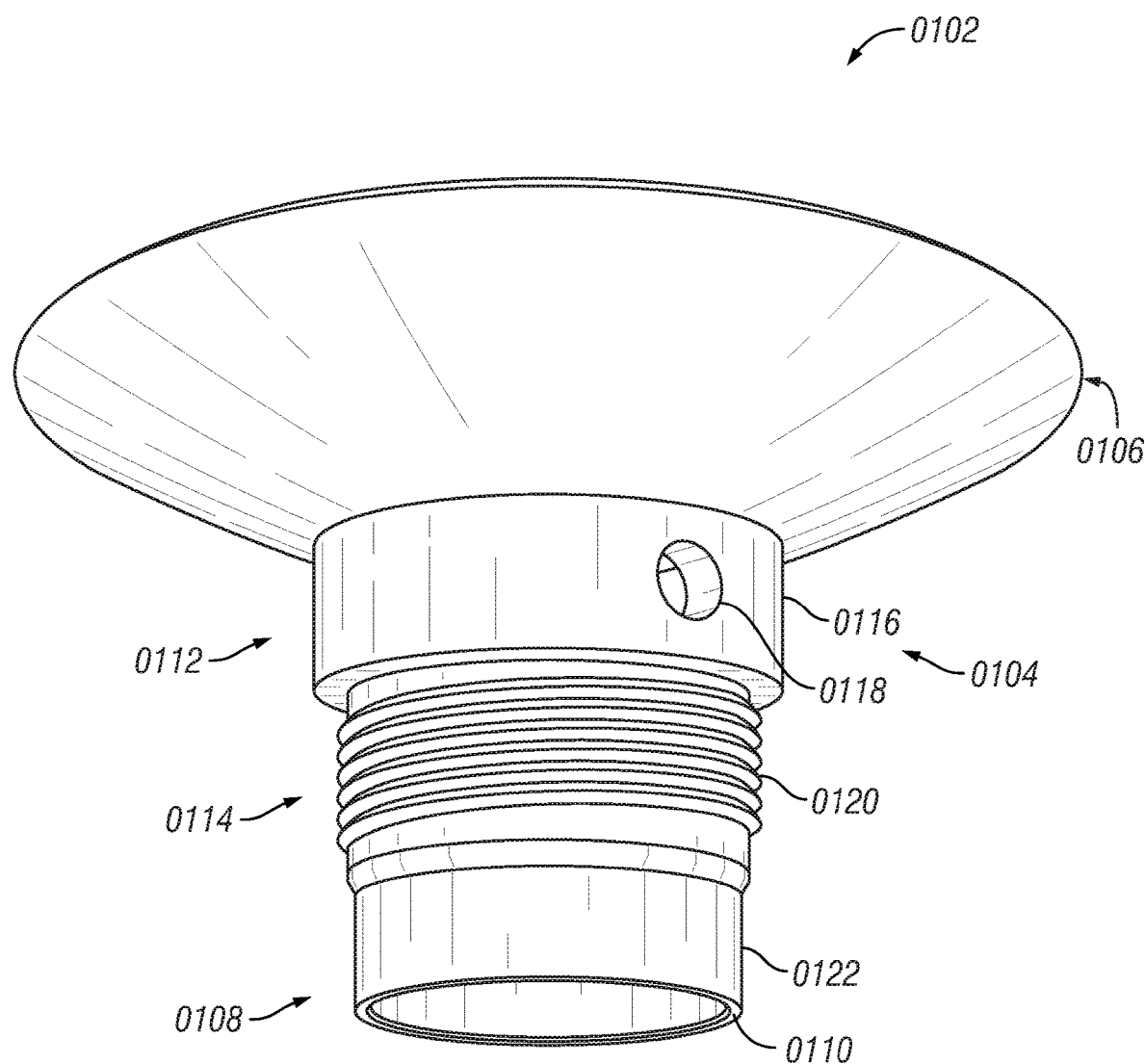
FIG. 1 is a perspective view taken from the front, the bottom and the left of an illustrative apparatus for guiding a gripping tool.
Figure 2:
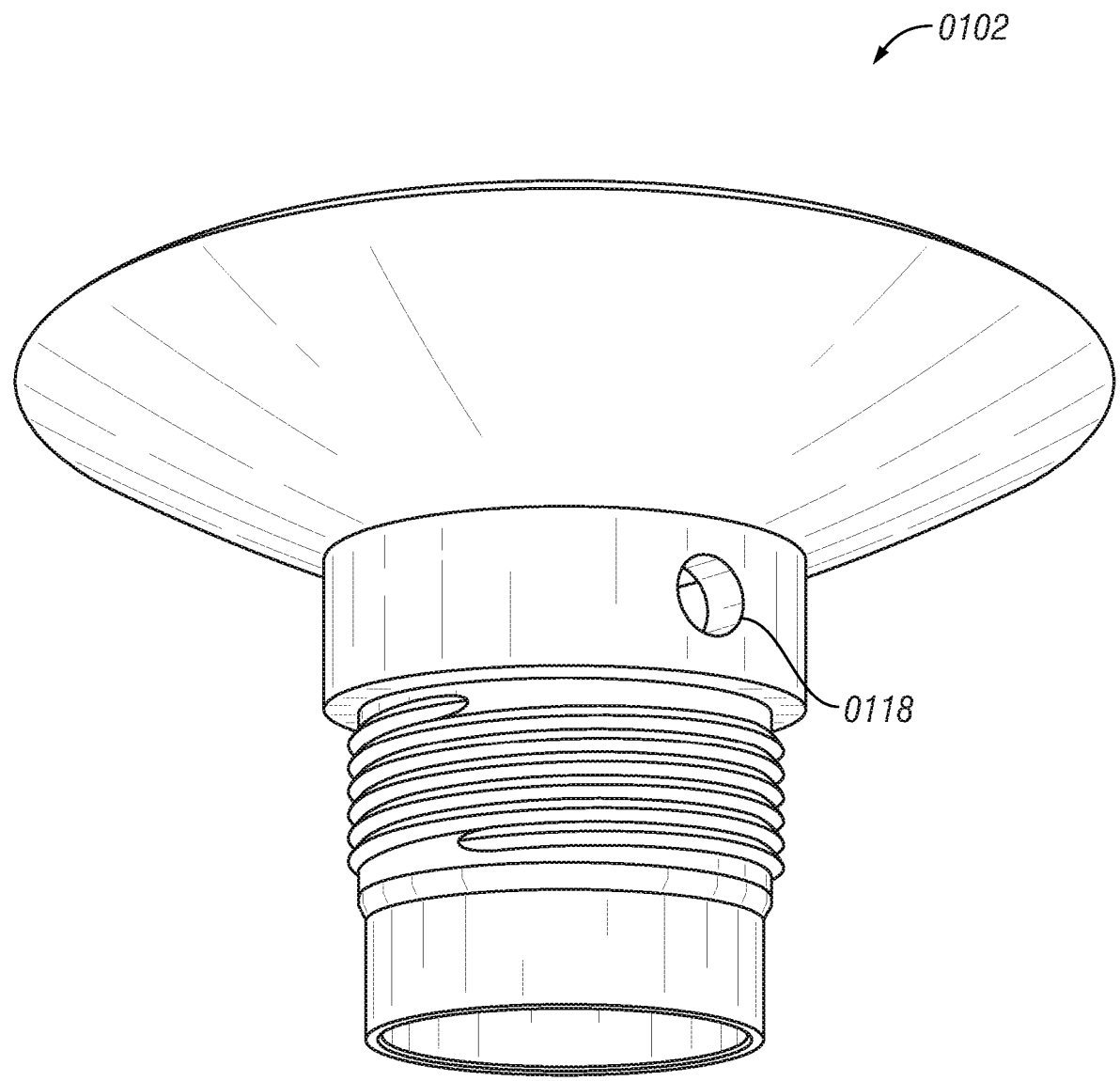
FIG. 2 is a perspective view taken from the rear, the bottom and the right of the apparatus of FIG. 1.

In some embodiments, the apparatuses, systems and methods described in the present application solve one or more problems. For example, in some embodiments, the apparatuses, systems and methods can help reduce the skill, time, cost, or any combination thereof that is required to install a gripping tool in a target structure that is to be gripped. For example, in some embodiments, an apparatus of the present disclosure comprises a nubbin and a guide structure coupled to the nubbin. Additionally, when the nubbin is coupled, for example, by threading, to a tubular structure, the guide structure can help to guide a casing running tool into position in the tubular structure, which can be a pipe or casing in a wellbore.

In some embodiments, the apparatuses, systems, and methods described in the present disclosure can save an operator of drilling equipment significant time. For example, the task of inserting a casing running tool into position in a tubular structure can take approximately 5 to 8 minutes on average. Depending on conditions and operator skill, it is also possible for the task to take two hours or more. As an example of conditions that can effect this task, wind can cause the casing running tool, the tubular structure, or both to sway. Accordingly, when the conditions are less optimal, an experienced operator can be required to insert a casing running tool into position, and even a skilled operator can take more time than usual. However, by using an apparatus, system or method described herein, the time required can be significantly reduced. For example, by using an apparatus comprising a nubbin and guide structure as described herein, depending on conditions, the time required to insert a casing running tool into position can be reduced to less than 5 minutes, no more than 4 minutes, no more than 3 minutes, no more than 2 minutes, no more than 1 minute or about 1 to 2 minutes, the times being either absolute times or averages over at least two insertions of one or more casing running tools, and optionally up to 10 consecutive insertions of one or more casing running tools. As used in this context, an average insertion time for consecutive insertions using an apparatus is calculated using every insertion that occurs from a first time when a first insertion occurs to a final time when a final insertion occurs. In other words, no insertions in the series of insertions are excluded from the calculation.

In some embodiments, the apparatuses, systems, and methods described in the present disclosure advantageously avoid adding significant weight to nubbins. For example, one or more operators can be required to pick up a nubbin and screw the nubbin into the end of a tubular pipe or casing, which can help protect the threads of the pipe or casing. In some embodiments, the addition of significant weight to a nubbin can be avoided by using a light weight material for the guide structure. As an example, a light weight material can be aluminium. As another example, a light weight material can be a material that has a density no greater than the density of aluminium, namely 2,710 kg/m^3. As another example, a light weight material can have a density of no more than 1.5, 1.4, 1.3, 1.2, or 1.1 times the density of aluminium. As another example, a light weight material can have a density of around 0.5 to 1.5 times 2,710 kg/m^3, or any value or range given by real numbers included in this range. In some embodiments, a light weight material can be polyurethane.

In some embodiments, the apparatuses, systems, and methods described in the present disclosure can be used to run pipes of all kinds more efficiently. For example, it can be possible to install joints of tubular at a rate of at least one joint per two minutes if conditions are typical or 1 joint every 4 minutes even if conditions are more difficult and potentially with relatively less skilled operators compared with the operators that would be required to achieve the same rates without the apparatus described in this disclosure.

In some embodiments, the apparatuses, systems, and methods described in the present disclosure can be universal. For example, the apparatuses, systems, and methods described in the present disclosure can be used to guide a gripping tool into any target structure coupled to or comprising any nubbin, even proprietary nubbins with non-standard threads. In some embodiments, this can be facilitated by sliding a guide collar of the guide structure over the nubbin collar of the nubbin, aligning a first guide aperture in the guide collar and a first nubbin aperture in the nubbin collar, aligning a second guide aperture in the guide collar and a second nubbin aperture in the nubbin collar, inserting a first pin through the first guide aperture and the first nubbin aperture and inserting a second pin through the second guide aperture and the second nubbin aperture. Advantageously, the pins can be configured so that they do not protrude past the inner surface of the nubbin, and thereby avoid protruding into an inner void of the nubbin. In some embodiments, the pins have a leading portion that is smooth and a trailing portion that is threaded, which can be used to couple each pin with a threaded portion of the corresponding guide aperture, thereby preventing the pins from being inadvertently dislocated and thereby preventing the guide structure and nubbin from being decoupled.

Additionally, while many nubbins have a common aperture size of approximately 1 inch, even if a nubbin had a smaller nubbin aperture size, a pin could easily be created that fits into both the threaded portion of a guide aperture and the smaller nubbin aperture size. Furthermore, if a nubbin aperture of a nubbin where greater than or smaller than 1 inch, the size of the corresponding guide aperture, the size of the corresponding pin, the sizes of corresponding portions of the corresponding pin, or a combination thereof can easily be modified so that the guide structure can be coupled to the nubbin.

Similarly, while many nubbins have a common outer diameter, even if a nubbin had a larger or smaller outer diameter, the inner diameter of the guide collar of the guide structure can easily be modified to fit easily around the outer diameter of the nubbin collar without the inner diameter of the guide collar being so much larger than the nubbin collar that the guide structure cannot be effectively coupled to the nubbin. In this context, effectively coupled means coupled sufficiently so that the guide structure is configured to guide a gripping tool into a target structure that is coupled to or comprises the nubbin.

Referring now to FIG. 1 through FIG. 11, an embodiment of an apparatus 0102 for guiding a gripping tool 1104 into a target structure 1102 will now be described. The apparatus 0102 comprises a nubbin 0104 and a guide structure 0106 fixed to the nubbin 0104.

The nubbin 0104 comprises a proximal nubbin end 0110 configured to be adjacent to the target structure 1102, a proximal nubbin portion 0108 adjacent to the proximal nubbin end 0110, a distal nubbin end 1002 (see FIG. 10) opposite the proximal nubbin end 0110, and a distal nubbin portion 0112 adjacent to the distal nubbin end 1002. The proximal nubbin portion 0108 comprises a nubbin coupling 0114, for example, nubbin outer screw threads 0120 as illustrated in FIG. 1. Nonetheless, a different type of couple can be used as well. For example, a magnetic coupling can be configured to be coupled to the target structure 1102.

Figure 3:
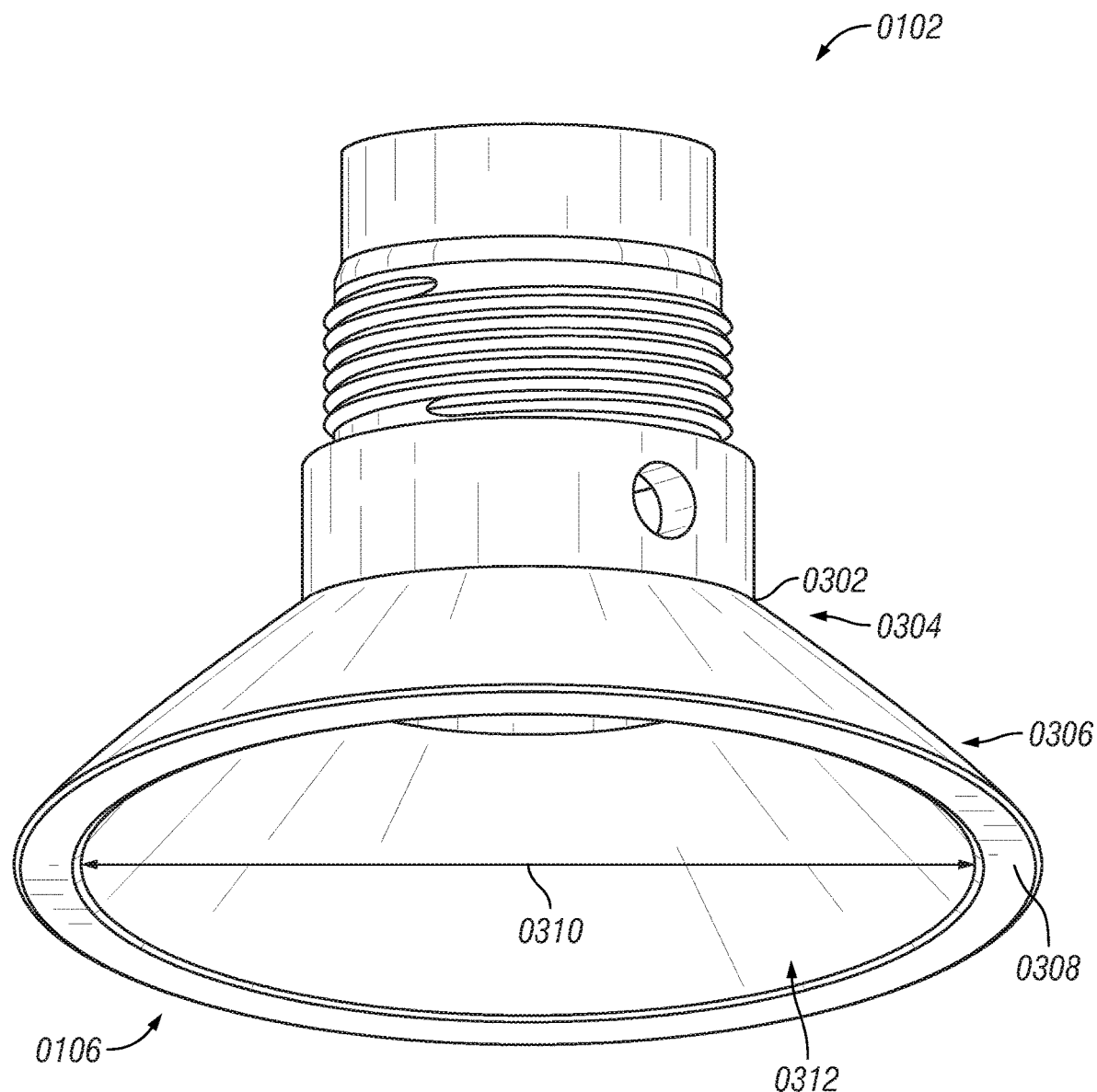
FIG. 3 a perspective view taken from the front, the top, and the right of the apparatus of FIG. 1.
Figure 4:
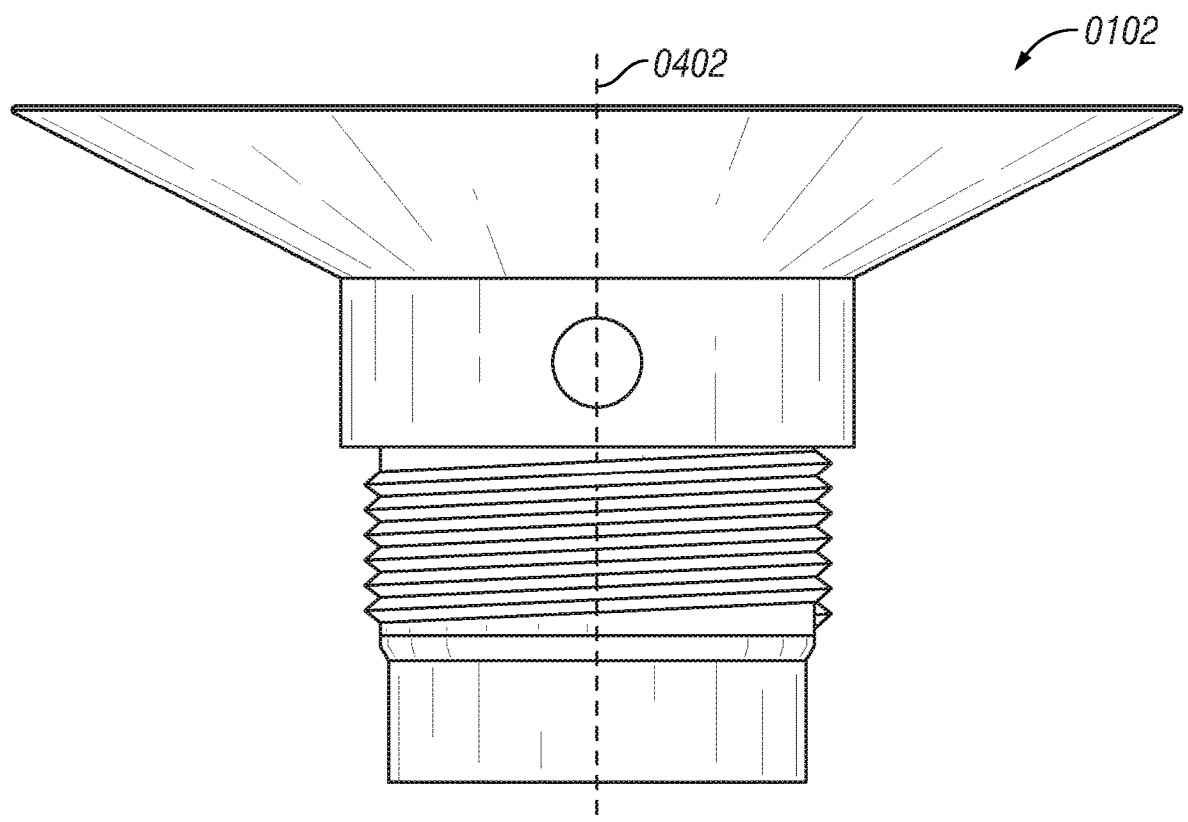
FIG. 4 is a front view of the apparatus of FIG. 1.
Figure 5:
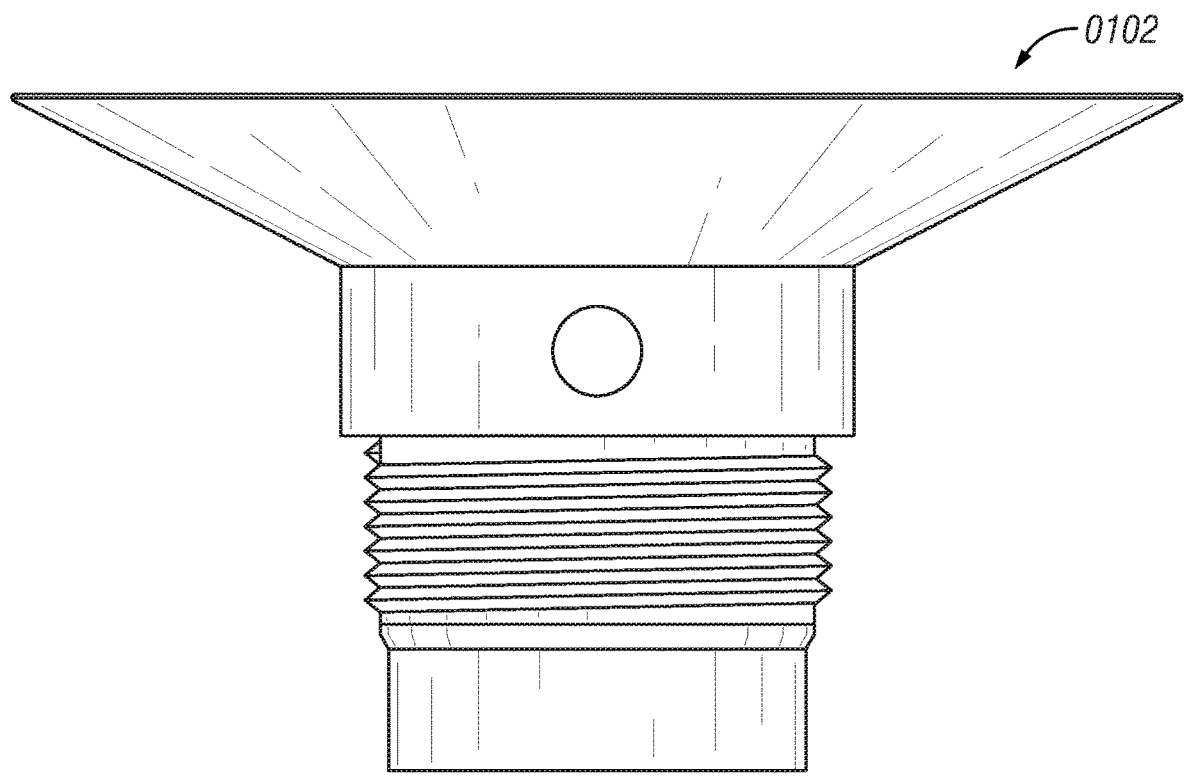
FIG. 5 is a rear view of the apparatus of FIG. 1.
Figure 6:
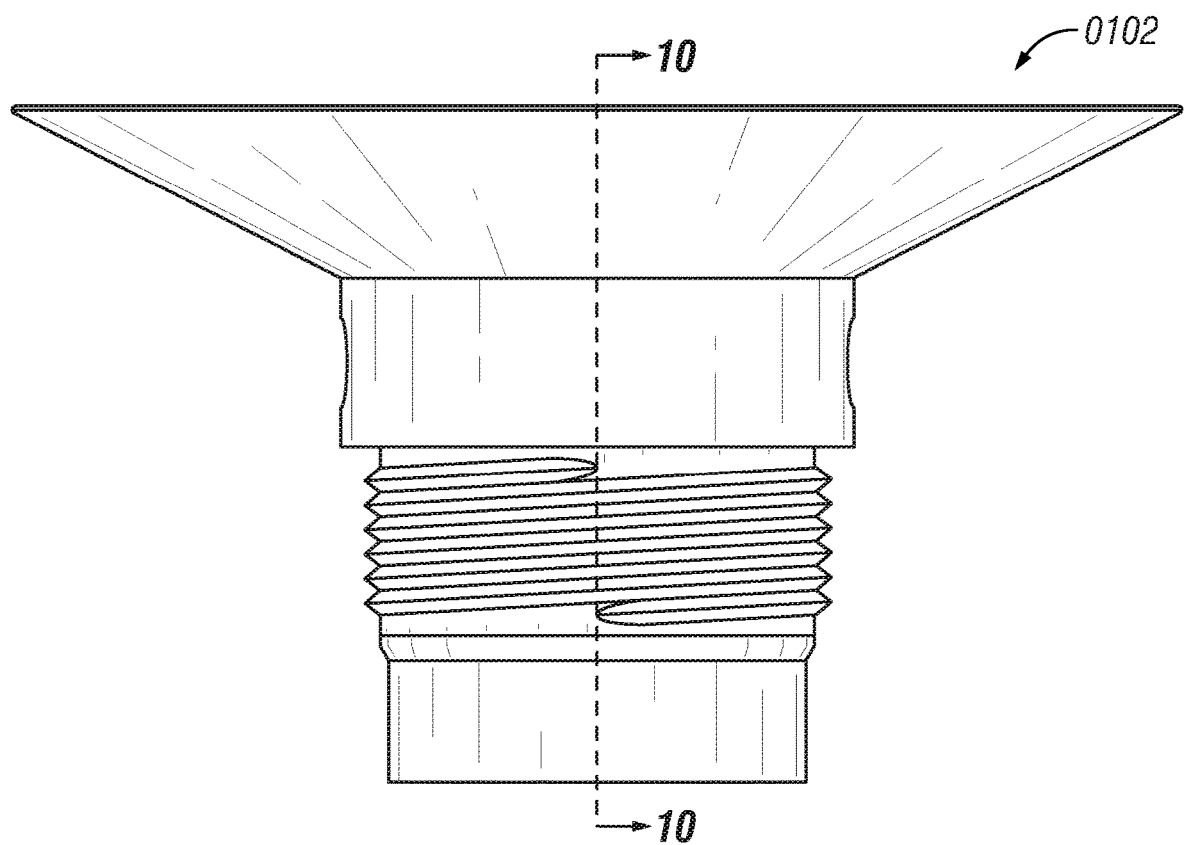
FIG. 6 is a right side view of the apparatus of FIG. 1.
Figure 7:
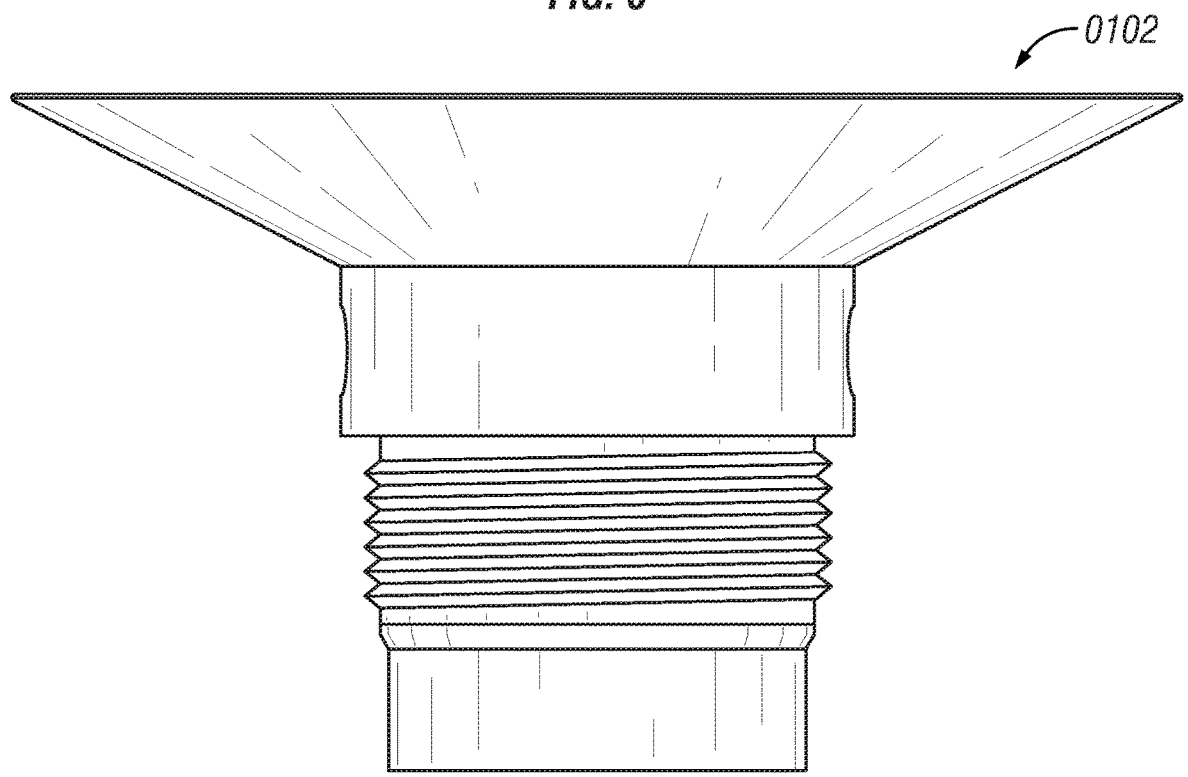
FIG. 7 is a left side view of the apparatus of FIG. 1.
Figure 8:
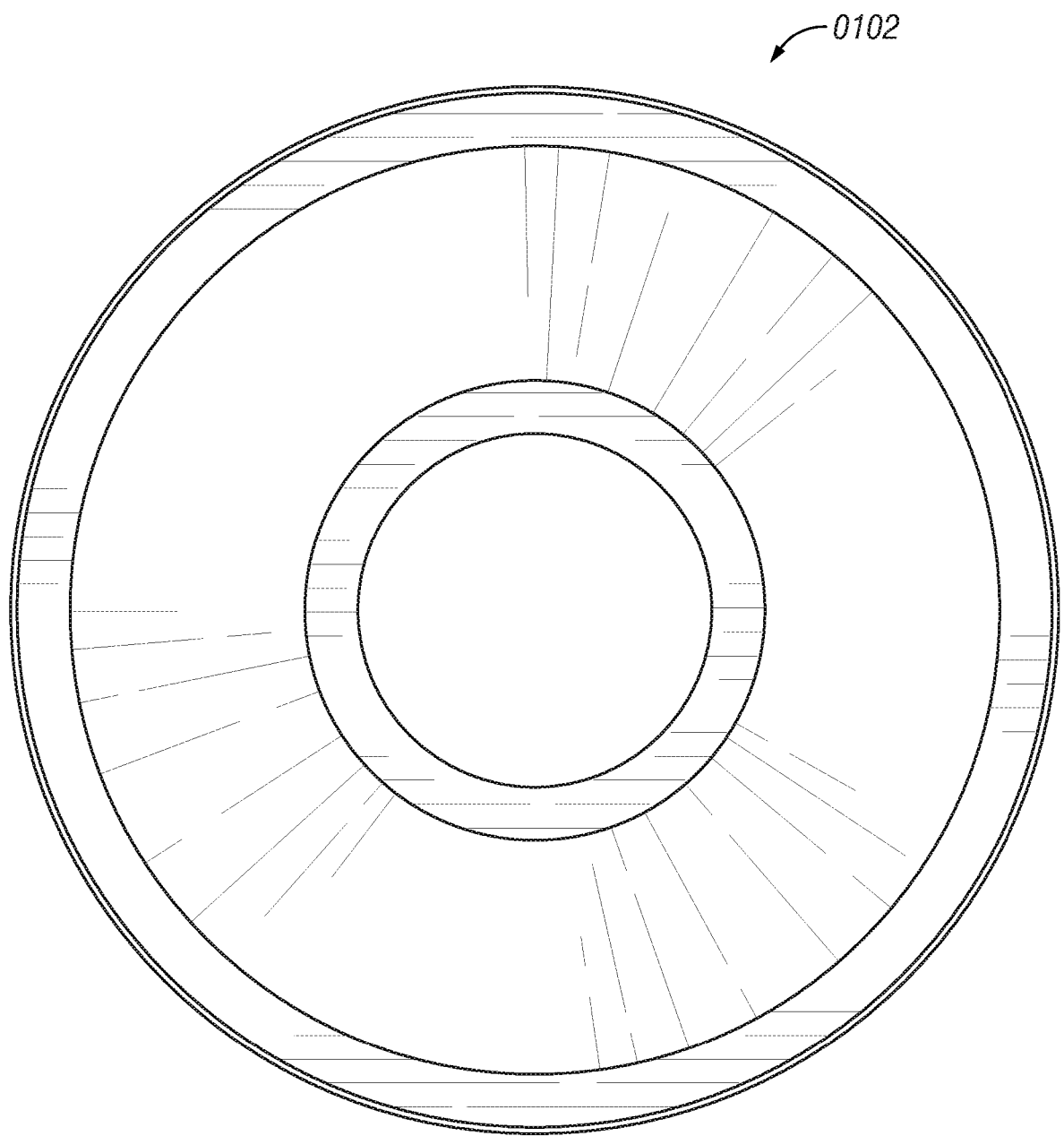
FIG. 8 is a top view of the apparatus of FIG. 1.
Figure 9:
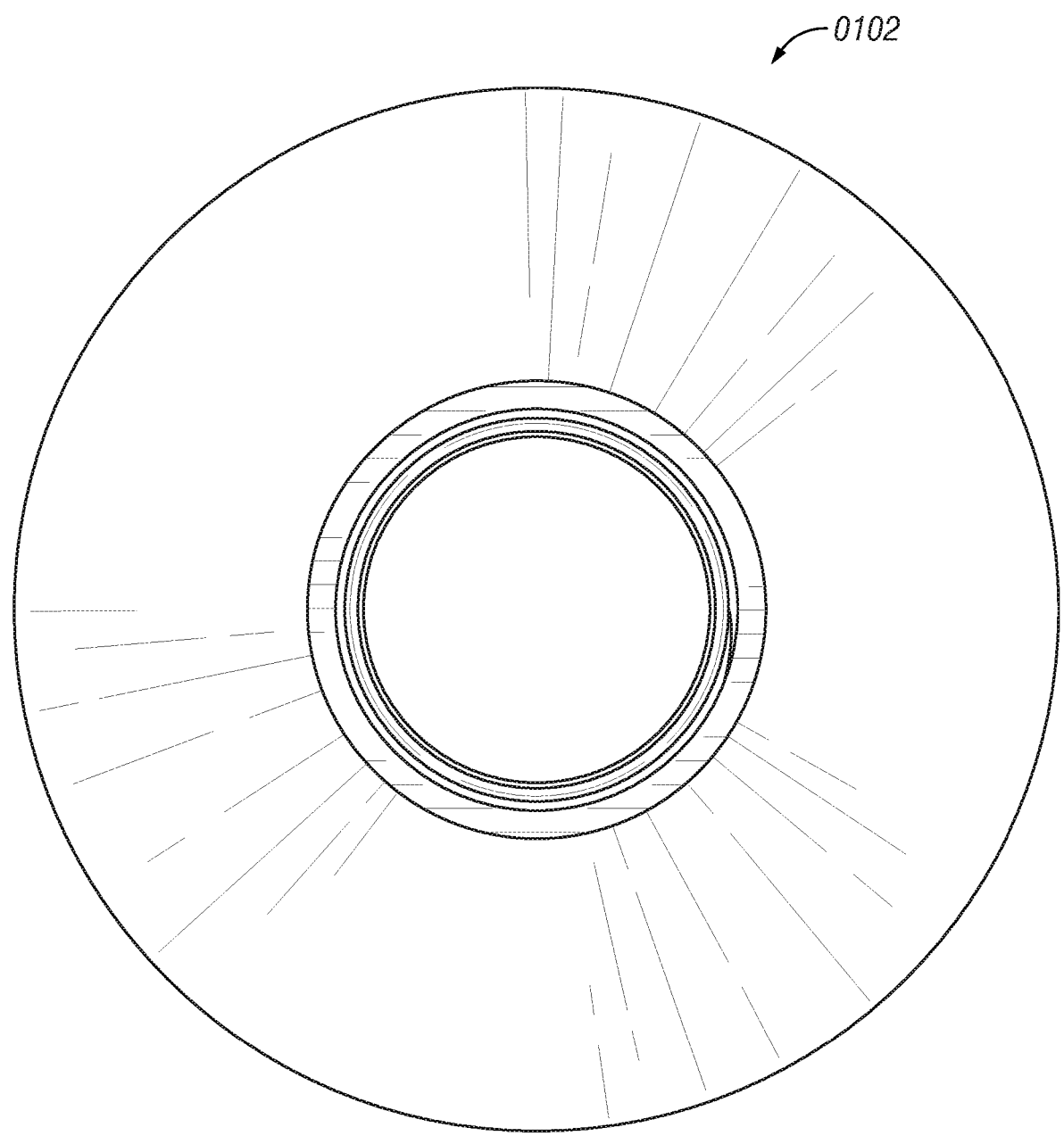
FIG. 9 is a bottom view of the apparatus of FIG. 1.
Figure 10:
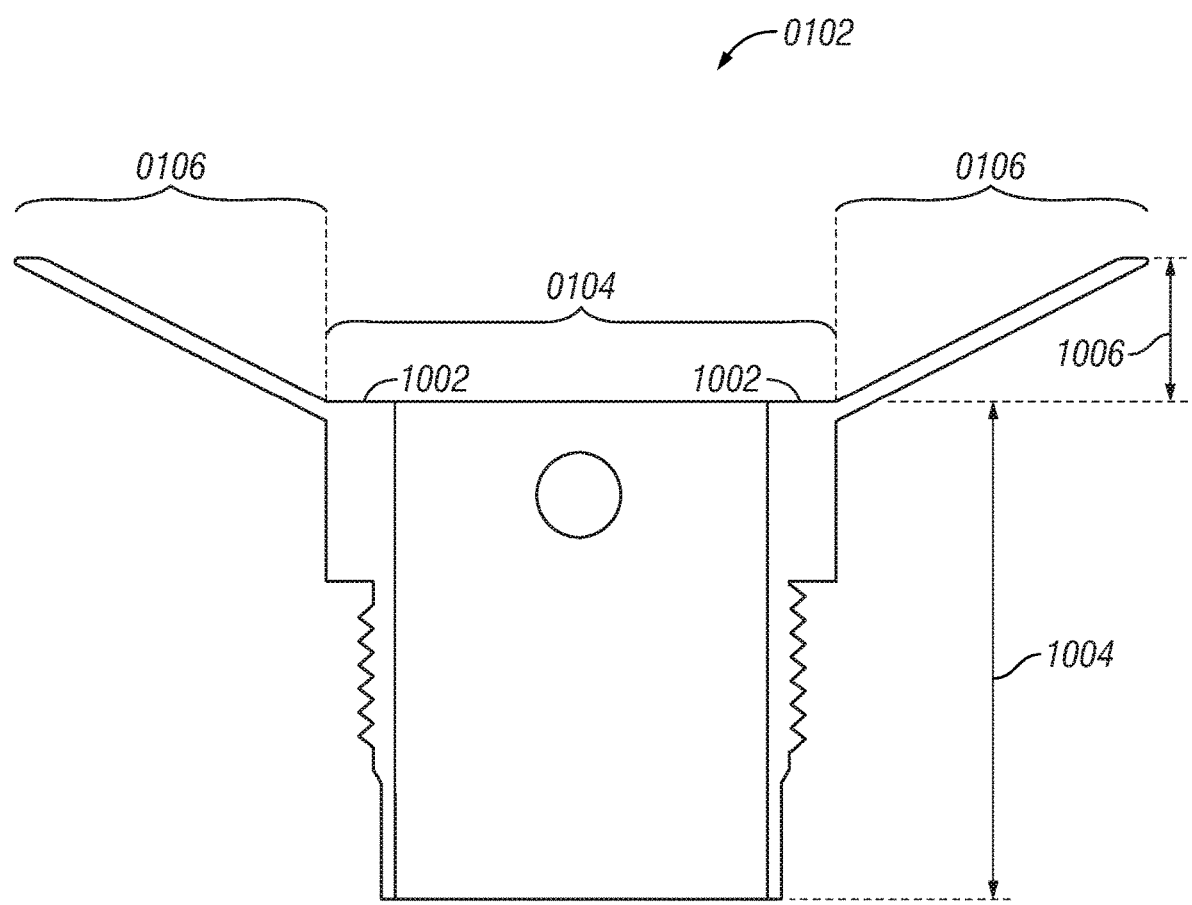
FIG. 10 is a schematic cross-sectional view of the apparatus of FIG. 1 taken along Section 10-10 as depicted in FIG. 6.

With reference to FIG. 1 and FIG. 3, the guide structure 0106 comprises a proximal guide end 0302 adjacent to the nubbin 0104, a proximal guide portion 0304 adjacent to the proximal guide end 0302, a distal guide end 0308 opposite the proximal guide end 0302, a distal guide portion 0306 adjacent to the distal guide end 0308, and an inner void 0312. The inner void 0312 can be in the form of a conduit and can have a cross-sectional dimension 0310 (e.g., diameter) that increases from the proximal guide end 0302 to the distal guide end 0308. As illustrated in the embodiment of FIG. 1 and FIG. 3, the proximal guide portion 0304 is fixed to the distal nubbin portion 0112. This can be done with screws, or fasteners of any kind known in the art. Additionally, this can be accomplished by adhering the proximal guide portion to the distal nubbin portion. As another example, this can be accomplished by making the guide structure and the nubbin integral so that they form a single continuous structure.

With reference again to FIG. 1, the nubbin 0104 can comprise a nubbin collar 0116. As can be seen, in some embodiments, the nubbin 0104 or the nubbin collar 0116 comprises a plurality of collar apertures 0118 comprising a first collar aperture, which can be opposite a second collar aperture, both apertures being configured to receive a rod. Furthermore, the central axis of the first collar aperture 0118 and the central axis of the second collar aperture 0118 can be approximately perpendicular to the central axis 0402 of the nubbin 0104.

In some embodiments, the nubbin 0104 comprises an external screw thread 0120, which can be located between the nubbin collar 0116 and the proximal nubbin end 0110.

In some embodiments, the nubbin 0104 comprises a non-threaded outer surface 0122 without screw thread. The non-threaded outer surface 0122 can be located between the external screw thread 0120 and the proximal nubbin end 0110. As illustrated in FIG. 1, the non-threaded outer surface 0122 can have an outer dimension (e.g., diameter) that is smaller than the outer dimension (e.g. diameter) of the external screw thread 0120.

With reference now to FIG. 3, in some embodiments, the guide structure 0106 has a truncated conical shape or a bell shape. However, other shapes for the guide structure are also possible, for example, a hemispherical shape. Additionally, as illustrated, the inner surface of the guide structure 0106 can have a truncated conical shape or a bell shape, although other shapes, for example, a hemispherical shape are also possible. Accordingly, in some embodiments, the system can comprise any component described in this disclosure and any combination of components described in this disclosure.

Figure 11:
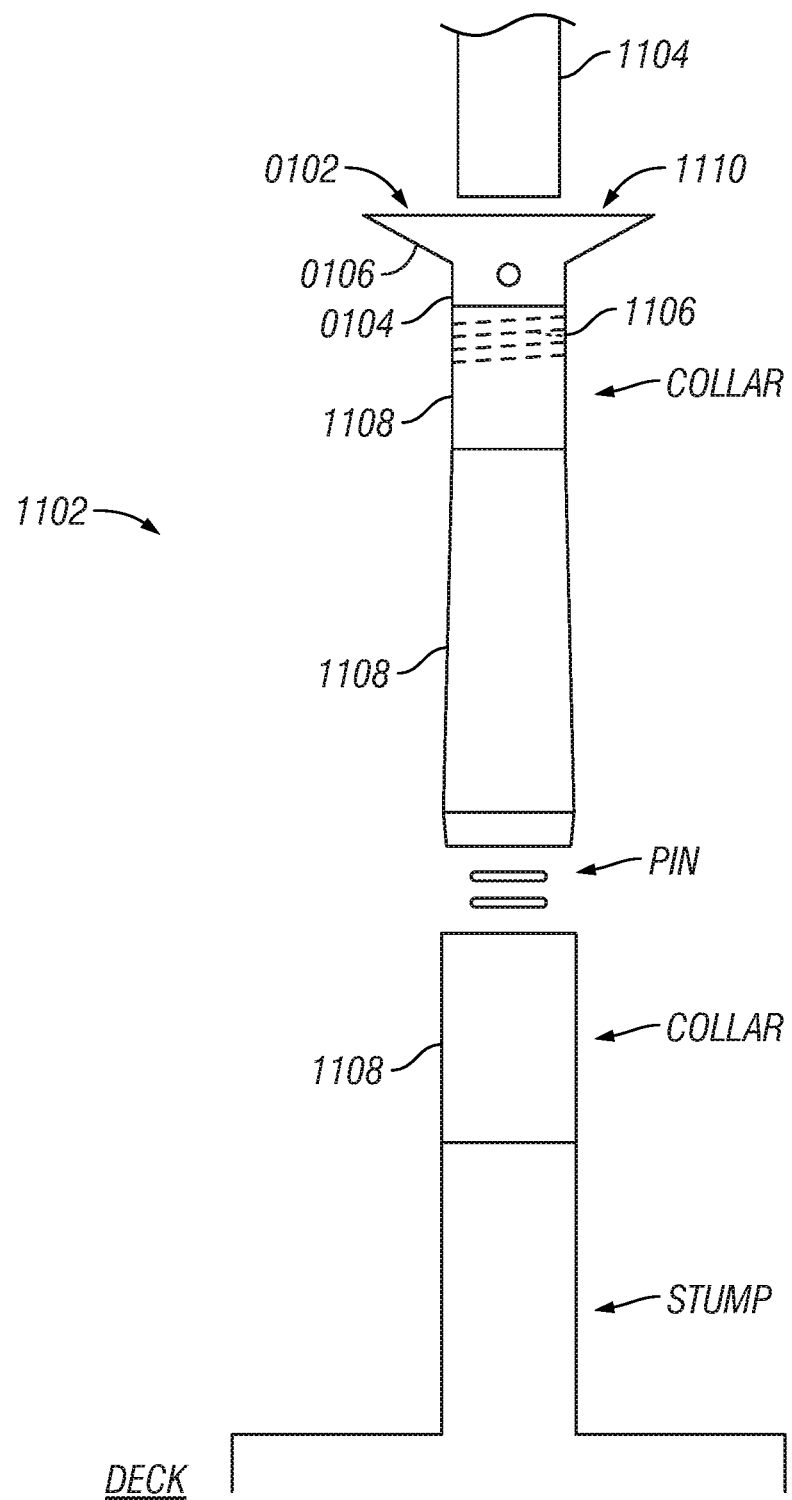
FIG. 11 is an illustration of an embodiment of an apparatus comprising a nubbin and a guide structure, the apparatus being used to guide a gripping tool into position for use in drilling a wellbore.
Figure 12:
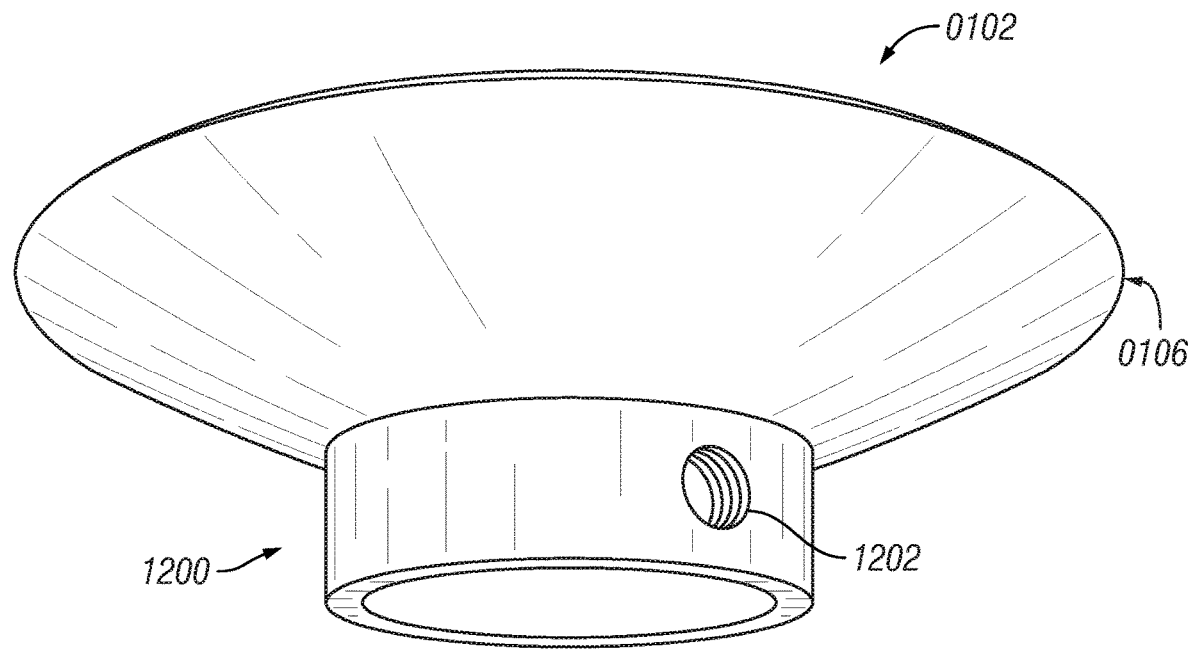
FIG. 12 is a perspective view taken from the front, the bottom and the left of an illustrative apparatus for guiding a gripping tool.
Figure 13:
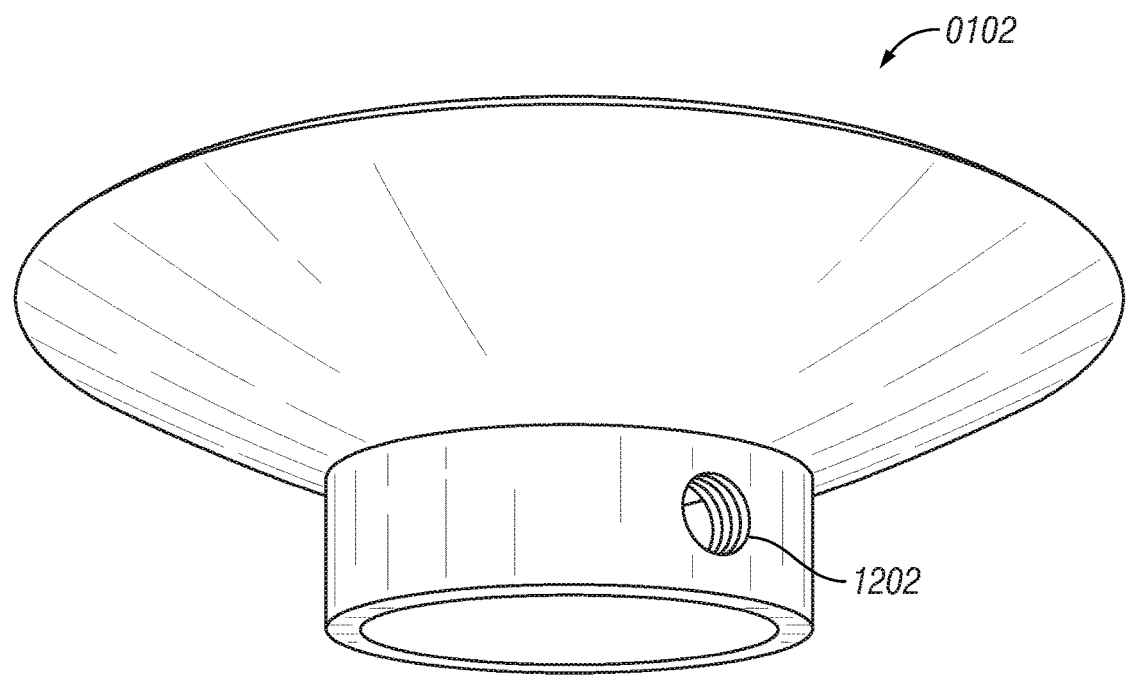
FIG. 13 is a perspective view taken from the rear, the bottom and the right of the apparatus of FIG. 12.

Referring to FIG. 11, a system comprising an apparatus 0102 as described herein will now be described. As illustrated, the system can comprise the target structure 1102, the gripping tool 1104, a cylindrical rod (e.g., having a length long enough to pass through both a first aperture 0118 and a second aperture 0118 on the nubbin collar 0116); or a combination thereof. In some embodiments, the system can comprise any component described in this disclosure.

With further reference to FIG. 11, a method of using an apparatus 0102 as described herein will now be described. As illustrated, the apparatus 0102 comprises a nubbin 0104 and a guide structure 0106 coupled to the nubbin 0104. The method comprises several steps. A first step comprises coupling the nubbin 0104 to a target structure 1102 to be gripped by a gripping tool 1104. A second step comprises moving a leading portion 1110 of the gripping tool 1104 through the apparatus 0102 and into the target structure 1102. For example, the leading portion 1110 of the gripping tool 1104 can be moved from a first position outside the guide structure 0106 to a second position inside the guide structure 0106, then from the second position inside the guide structure 0106 to a third position inside the nubbin 0104, and then from the third position inside the nubbin 0104 to a fourth position inside the target structure 1102.

As illustrated, the target structure 1102 can comprise a tubular or plurality of tubulars, which can be interconnected tubulars that form a continuous conduit within the tubulars. Additionally as illustrated, the target structure can be located at a site for drilling a wellbore. As examples, the target structure 1102 can comprise a pipe, a plurality of pipes or casing. Additionally, as illustrated, the nubbin can be coupled to the target structure by engagement between the nubbin screw thread 0120 and the target screw thread 1106, which is shown as dashed, since the target screw thread 1106 would not actually be visible from the outside of the target structure 1102.

With reference to FIGS. 12 to 22, an illustration is provided for an embodiment of an apparatus 0102 for guiding a gripping tool 1104 into a target structure 1102 to be gripped. The apparatus comprises a guide structure 0106 configured to be fixed to a nubbin 0104.

As illustrated with reference to FIGS. 23 to 25 and 27 to 28, the nubbin 0104 comprises a proximal nubbin end 0110 configured to be adjacent to the target structure 1102, a proximal nubbin portion 0108 adjacent to the proximal nubbin end 0110, a distal nubbin end 1002 opposite the proximal nubbin end 0110, and a distal nubbin portion 0112 adjacent to the distal nubbin end 1002.

As illustrated, the proximal nubbin portion 0108 comprises a nubbin coupling 0114 configured to be coupled to the target structure 1102. The distal nubbin portion 0112 comprises a nubbin collar 0116, the nubbin collar comprises a first nubbin aperture 0118 and a second nubbin aperture 0118 opposite the first nubbin aperture 0118.

Figure 14:
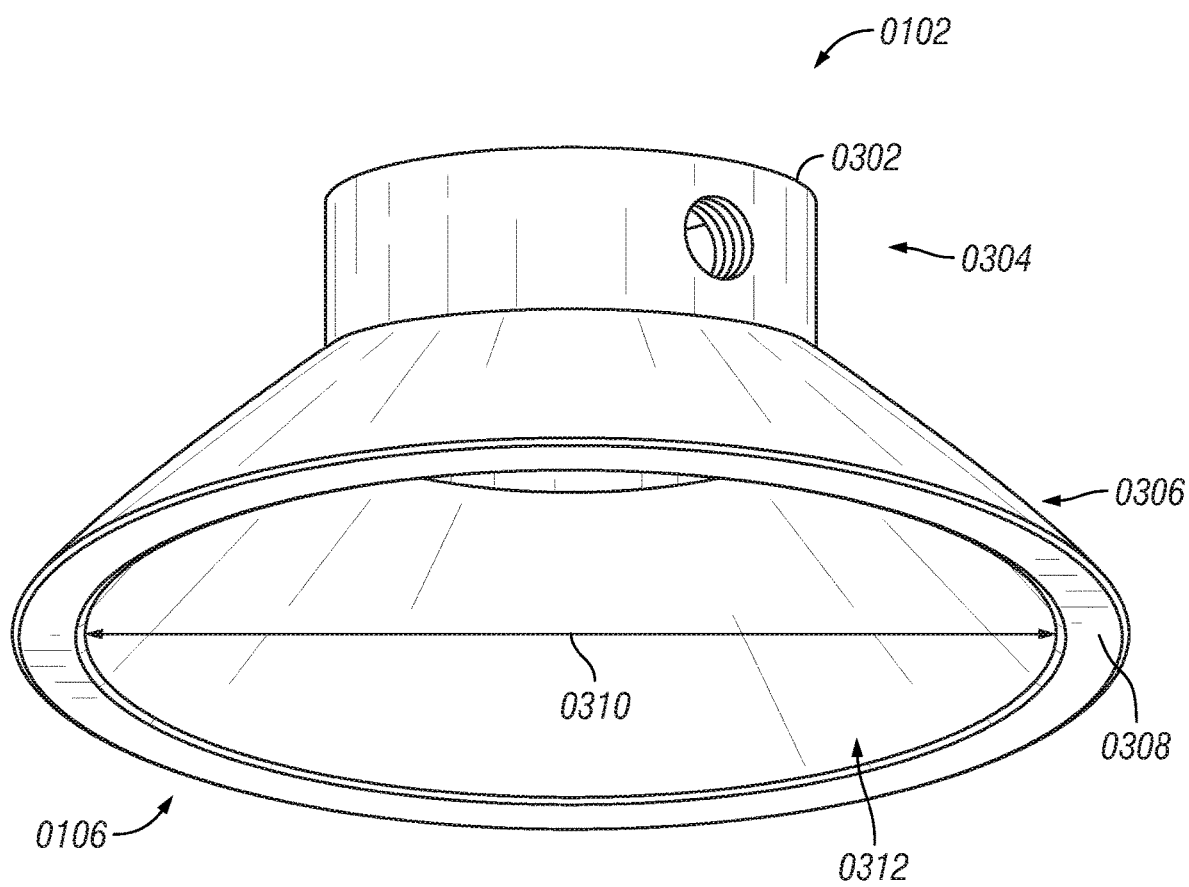
FIG. 14 a perspective view taken from the front, the top, and the right of the apparatus of FIG. 12.

With reference to FIG. 14, the guide structure 0106 comprises a proximal guide end 0302 configured to be adjacent to the nubbin 0104, a proximal guide portion 0304 adjacent to the proximal guide end 0302, a distal guide end 0308 opposite the proximal guide end 0302, a distal guide portion 0306 adjacent to the distal guide end 0308, and an inner void 0312 having a cross-sectional dimension 0310 that increases from the proximal guide end 0302 to the distal guide end 0308. As illustrated, the proximal guide portion 0304 is configured to be fixed to the distal nubbin portion 0112.

With further reference to the embodiment illustrated in FIGS. 12 to 22, the proximal guide portion 0304 of the guide structure 0106 comprises a guide collar 1200, the guide collar configured to receive the nubbin collar 0116 of the nubbin. The guide collar 1200 comprises a first guide aperture 1202 and a second guide aperture 1202 opposite the first guide aperture. The first guide aperture and the second guide aperture each being configured to receive a cylindrical rod that passes through both the first guide aperture and the second guide aperture.

Figure 15:
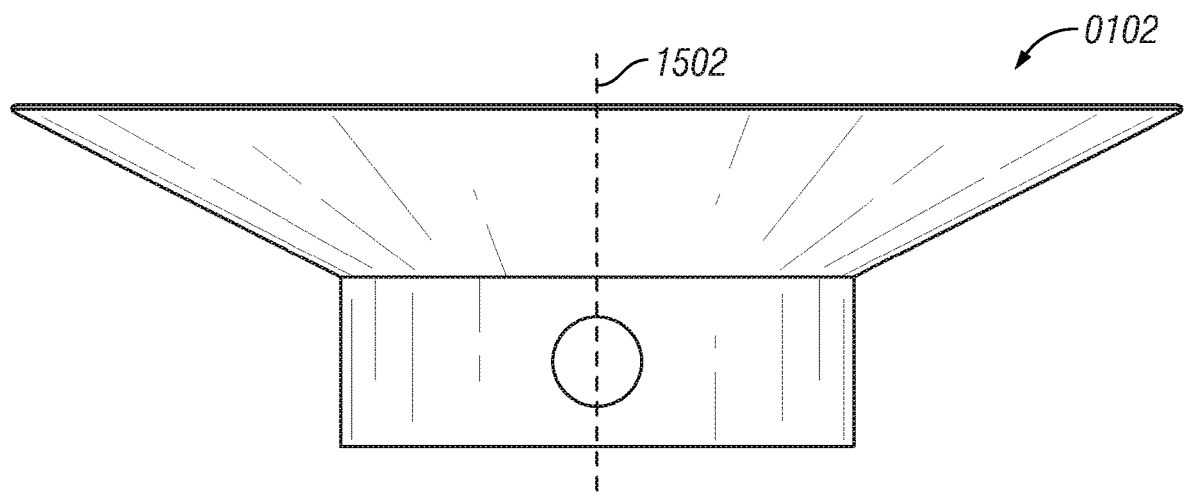
FIG. 15 is a front view of the apparatus of FIG. 12.
Figure 16:
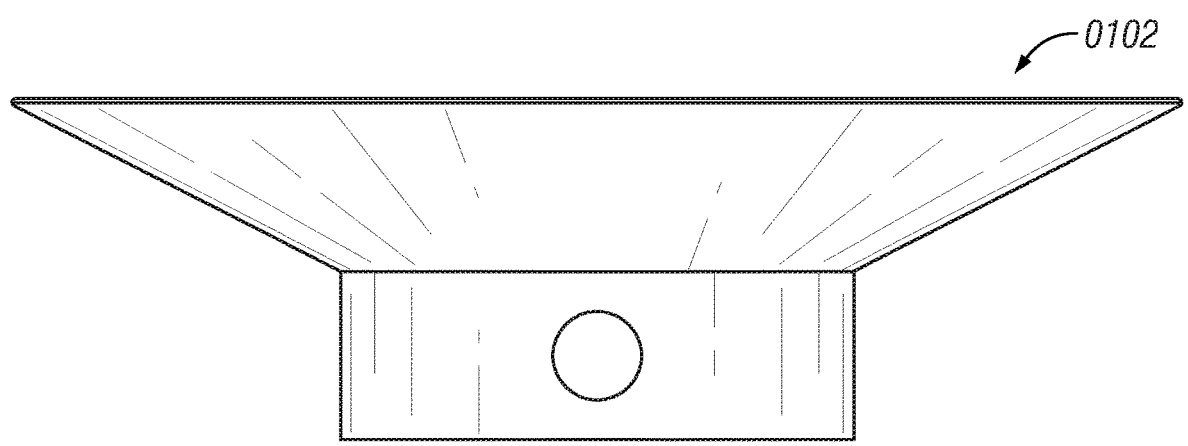
FIG. 16 is a rear view of the apparatus of FIG. 12.
Figure 17:
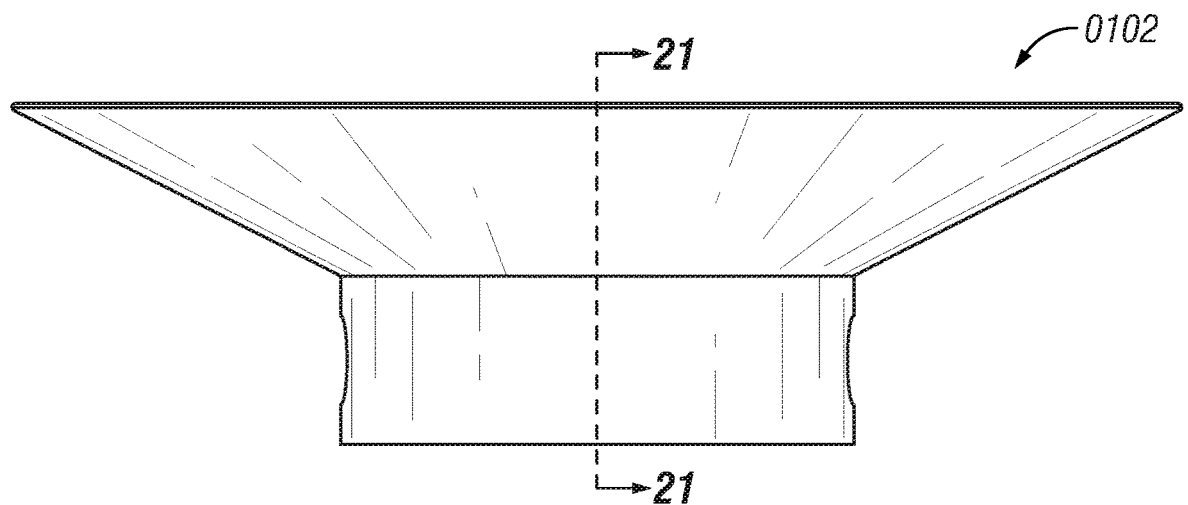
FIG. 17 is a right side view of the apparatus of FIG. 12.
Figure 18:
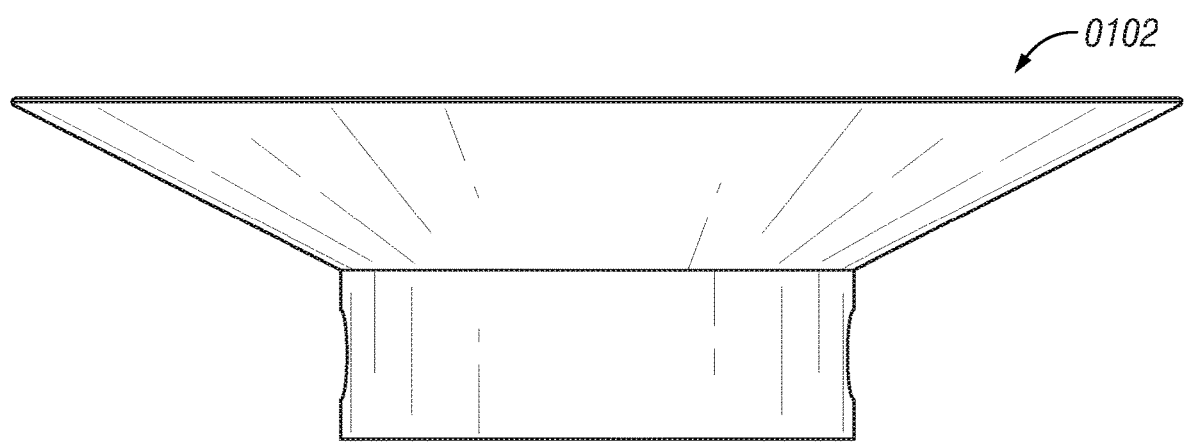
FIG. 18 is a left side view of the apparatus of FIG. 12.
Figure 19:
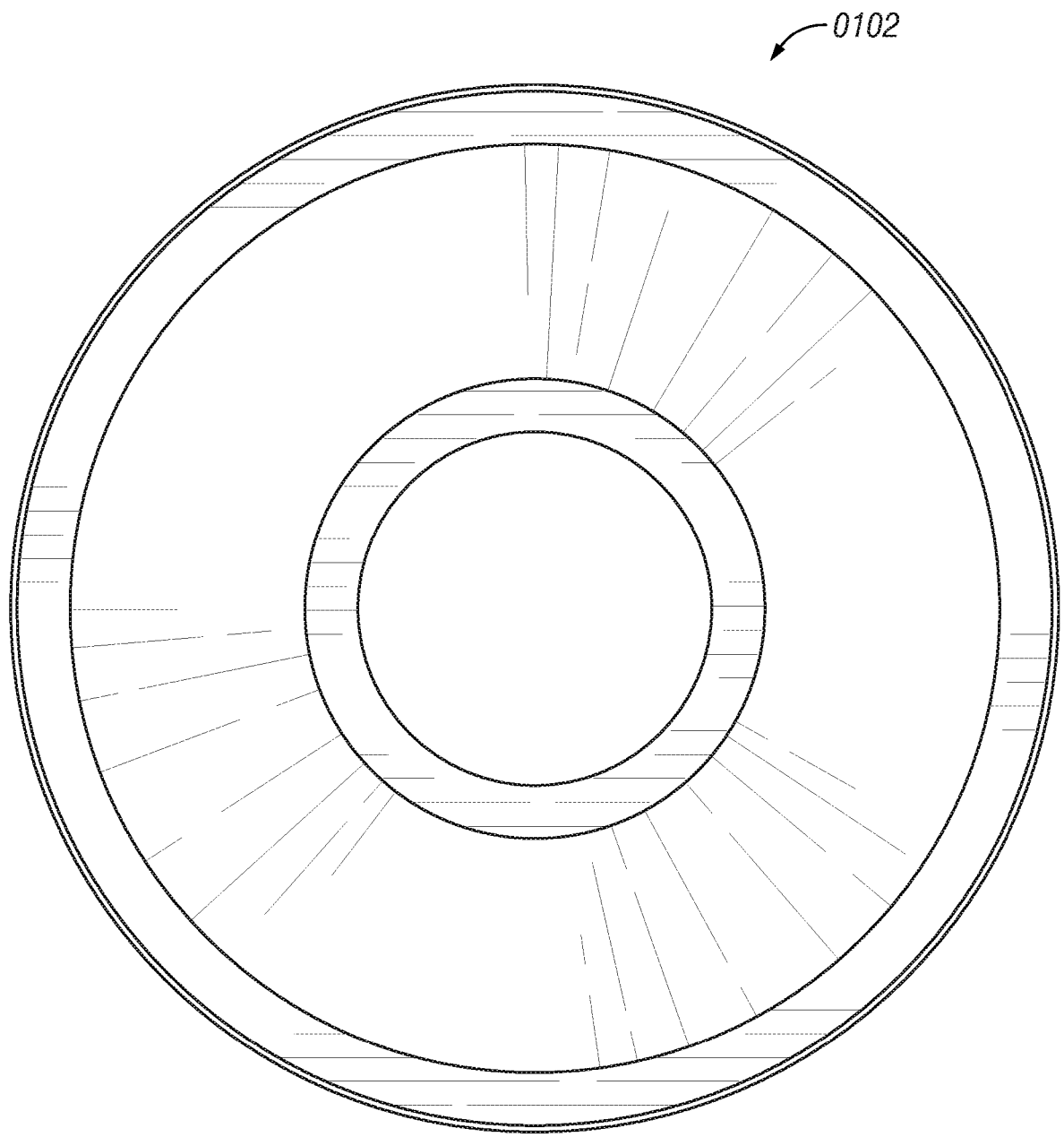
FIG. 19 is a top view of the apparatus of FIG. 12.
Figure 20:
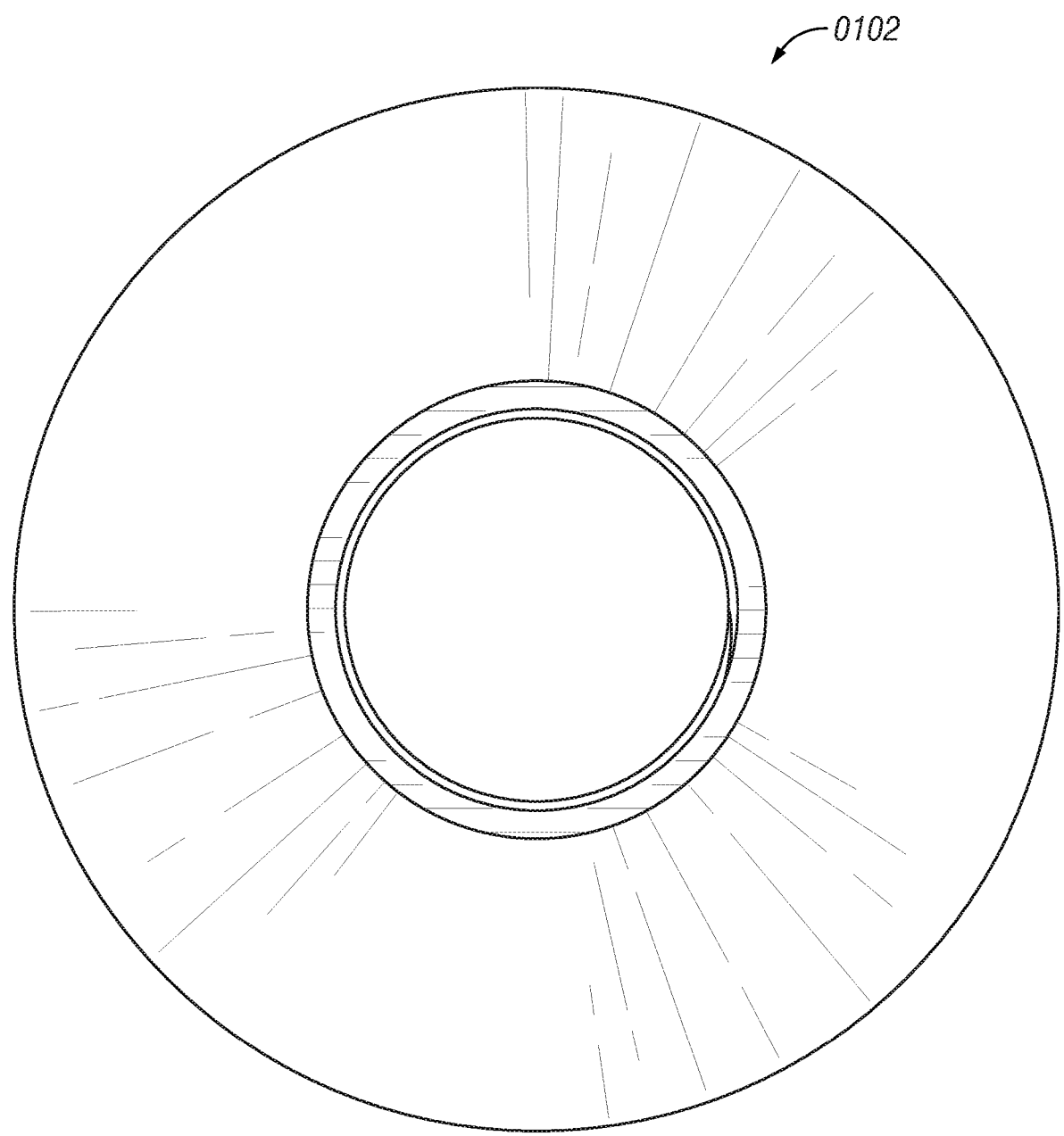
FIG. 20 is a bottom view of the apparatus of FIG. 12.
Figure 21:
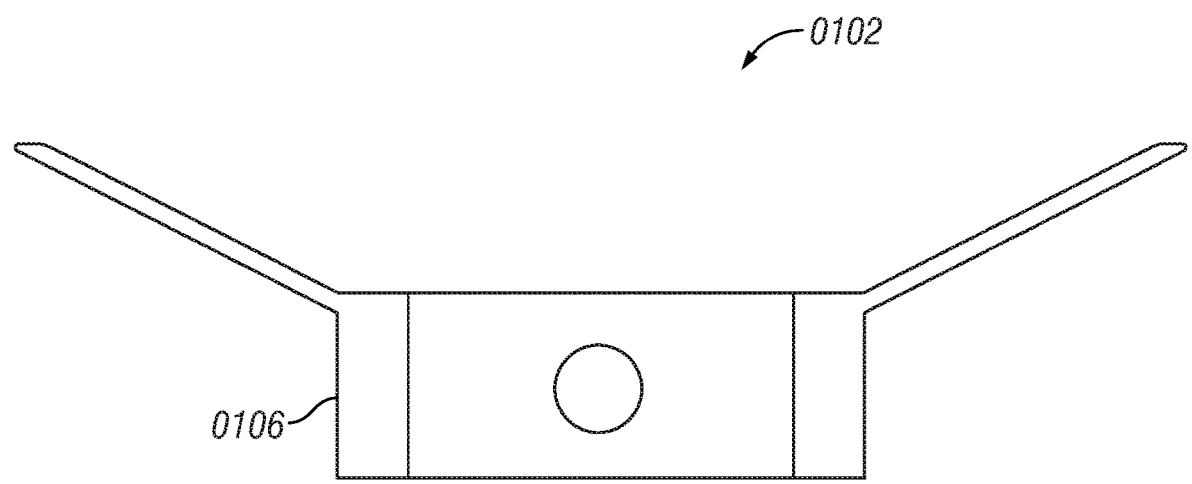
FIG. 21 is a schematic cross-sectional view of the apparatus of FIG. 12 taken along Section 21-21 as depicted in FIG. 17.

With reference to FIG. 15, a central axis 1502 of the apparatus 0102 (e.g., guide structure 0106) is illustrated.

Figure 26:
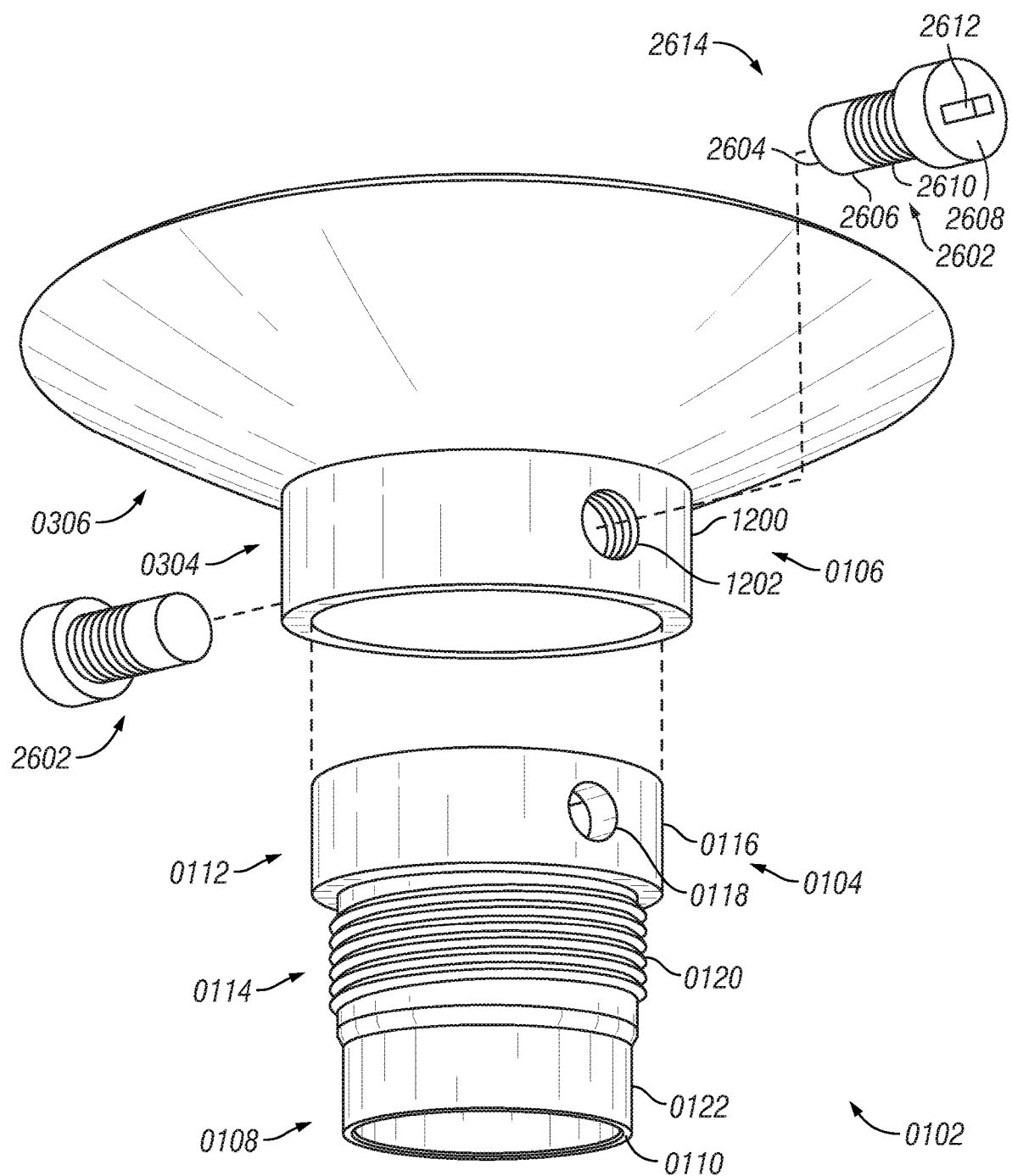
FIG. 26 is a perspective view taken from the front, the bottom and the left of an apparatus for guiding a gripping tool, the apparatus being shown in an exploded, uncoupled view.
Figure 27:
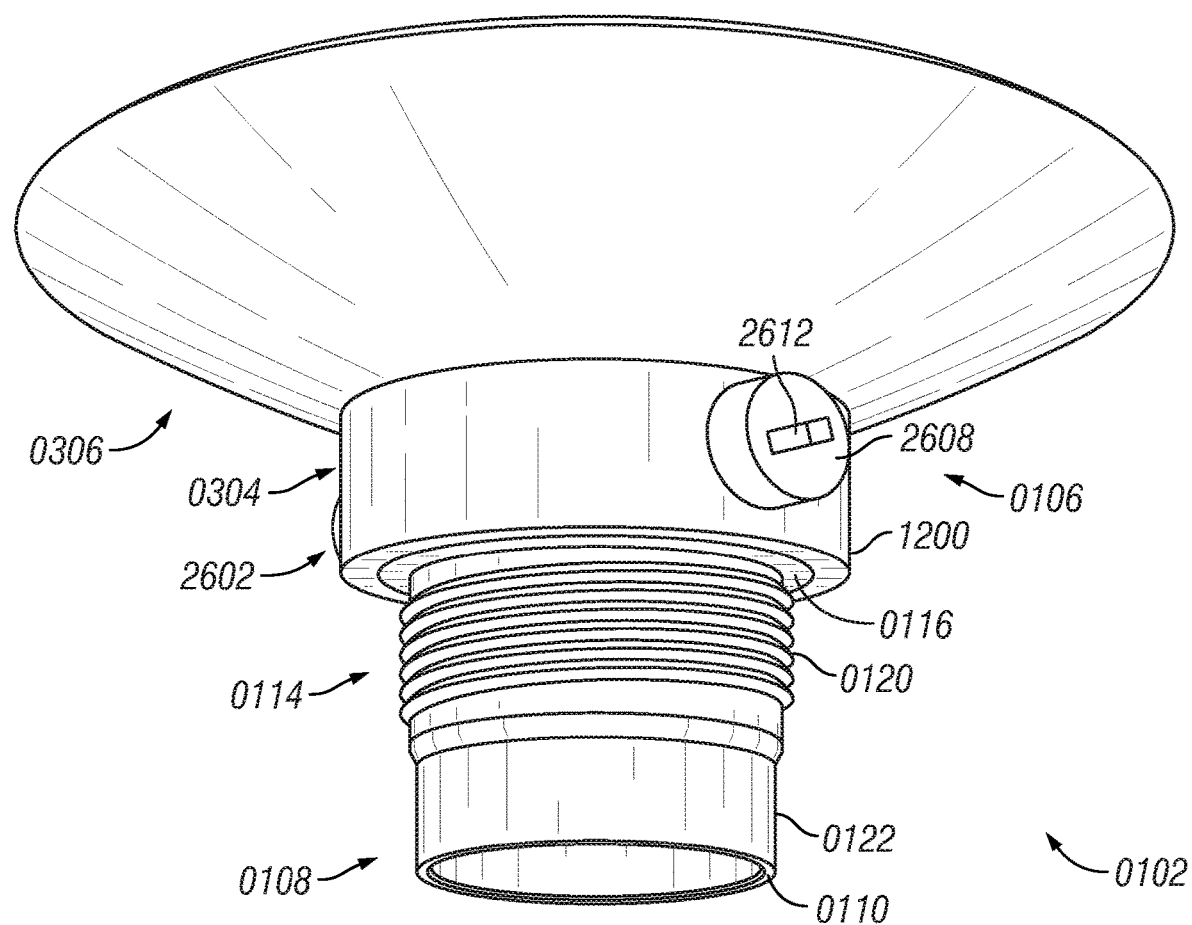
FIG. 27 is a perspective view taken from the front, the bottom and the left of the apparatus of FIG. 26, the apparatus being shown with the nubbin and guide structure coupled together using pins.
Figure 28:
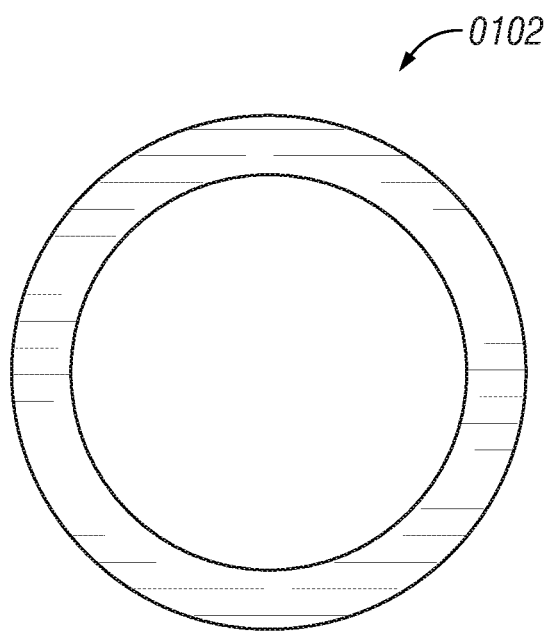
FIG. 28 is a top view of the nubbin of FIG. 23.
Figure 29:
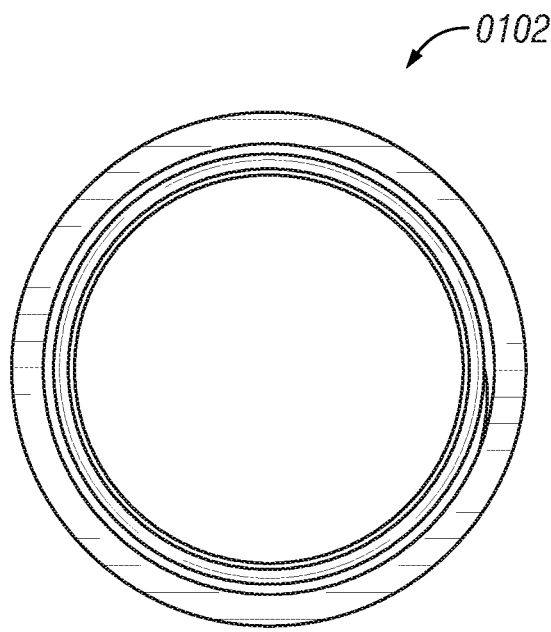
FIG. 29 is a bottom view of the nubbin of FIG. 23.

With reference to FIGS. 26 to 27, the apparatus can comprise a first pin 2602 configured to be inserted into the first guide aperture 1202. As illustrated, the first pin is configured to protrude past the first guide aperture 1202 and into a first nubbin aperture 0118 of a nubbin collar 0116 of the nubbin, and the nubbin collar 0116 is positioned inside the guide collar. As illustrated, the first guide aperture 1202 can comprise a first threaded inner aperture surface.

With reference to FIG. 26, in some embodiments, the first pin 2602 comprises a first leading end 2604, a first leading portion 2606 adjacent to the first leading end, a first trailing end 2608, and a first trailing portion 2610 positioned between the first leading portion 2606 and the first trailing end 2608. As illustrated, the first pin is configured to be inserted into the first guide aperture 1202, the first leading 2604 end is configured to be inserted into the first guide aperture 1202 before any other portion of the first pin 2602, and the first trailing portion 2610 can comprise a first threaded outer pin surface.

With reference again to FIG. 26, the first pin 2602 comprises a first rotator engagement portion 2612, the first rotator engagement portion configured to permit the first pin to be rotated so that the first threaded outer pin surface engages the first threaded inner aperture surface. As illustrated, the first rotator engagement portion 2612 can be positioned within the first trailing portion 2610 (e.g., at the first trailing end 2608) of the first pin 2602, for example, between the first threaded outer pin surface and the first trailing end 2608. The first pin 2602 (or the second pin 2602) can also comprise a radially extending portion configured to prevent the pin from continuing to travel into the first guide aperture 1202 (or second guide aperture 1202) after the pin has travelled a maximum desirable distance into the first guide aperture 1202 (or second guide aperture, respectively).

With reference again to FIG. 26, the first leading portion 2606 of the first pin 2602 can comprise a non-threaded outer pin surface configured to be inserted into the first nubbin aperture 0118 of the nubbin 0104. As illustrated, in some embodiments, the apparatus comprises a second pin 2602 configured to be inserted into the second guide aperture 1202. Additionally, the second pin 2602 can be configured to protrude past the second guide aperture 1202 and into a second nubbin aperture 0118 of the nubbin collar 0116 of the nubbin 0104. Furthermore, the second guide aperture 1202 can comprise a second threaded inner aperture surface.

With further reference to FIG. 26, the second pin 2602 comprises a second leading end 2604, a second leading portion 2606 adjacent to the second leading end 2604, a second trailing end 2608, and a second trailing portion 2610 positioned between the second leading portion 2606 and the second trailing end 2608. The second pin 2602 is configured to be inserted into the second guide aperture 1202. The second leading end 2604 is configured to be inserted into the second guide aperture 1202 before any other portion of the second pin 2602, and the second trailing portion 2610 can comprise a second threaded outer pin surface.

In some embodiments, the second pin 2602 comprises a second rotator engagement portion 2612, the second rotator engagement portion 2612 configured to permit the second pin 2602 to be rotated so that the second threaded outer pin surface engages the second threaded inner aperture surface.

In some embodiments, the second leading portion of the second pin 2602 comprises a non-threaded outer pin surface configured to be inserted into the second nubbin aperture 0118 of the nubbin 0104.

Generally, the features of the second guide aperture and the second pin can be identical to, analogous to, or similar to the corresponding features described for the first guide aperture and the first pin, respectively.

With reference again to FIG. 26, in some embodiments, a distal guide portion 0306 of the guide structure has a truncated conical shape.

Generally, features or combinations of features for the guide structure, nubbin, and combinations thereof that are discussed in this disclosure can be used in conjunction with the embodiment illustrated in FIGS. 12 to 27.

Figure 22:
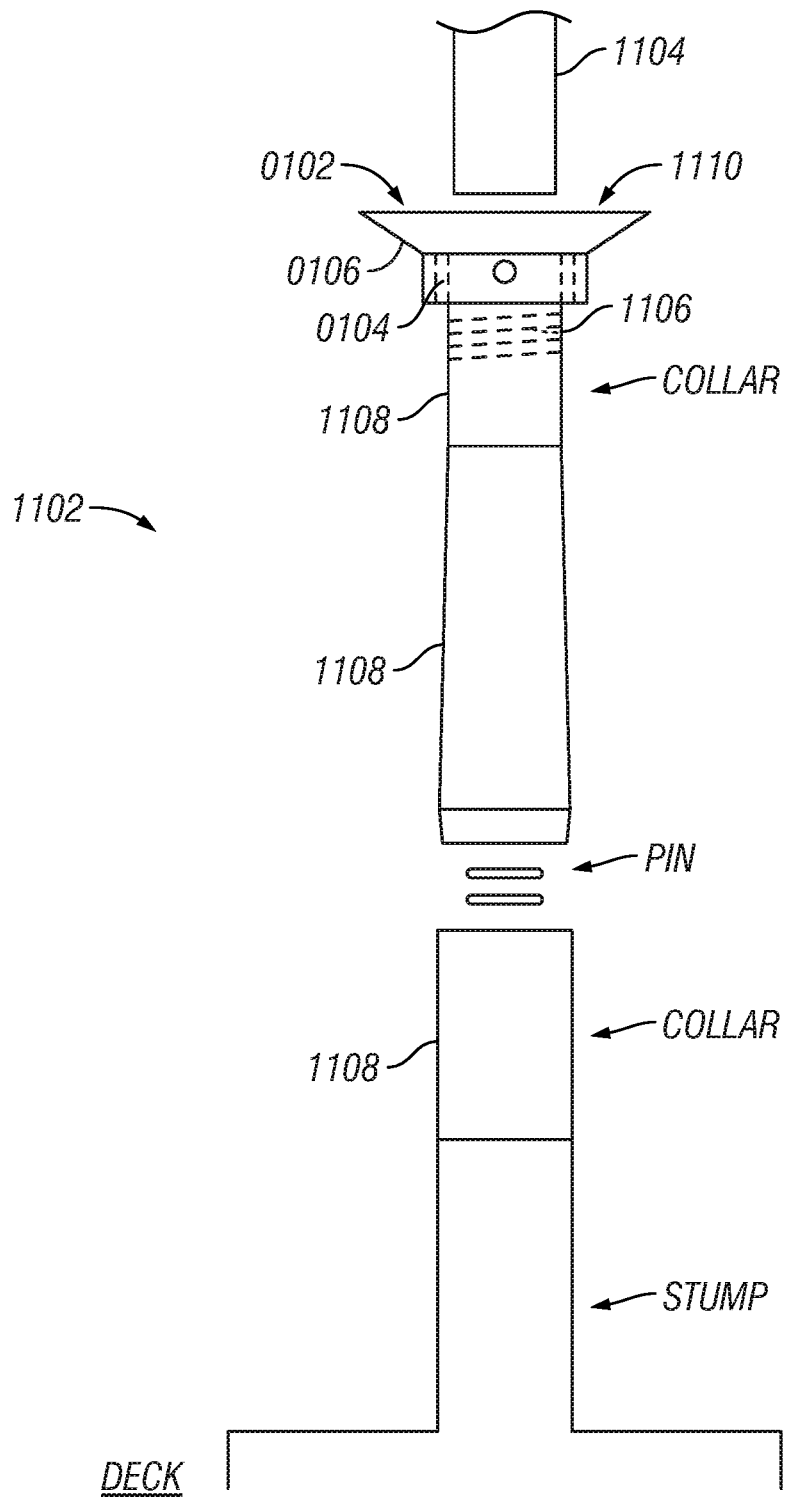
FIG. 22 is an illustration of an embodiment of an apparatus comprising a nubbin and a guide structure, the apparatus being used to guide a gripping tool into position for use in drilling a wellbore.
Figure 23:
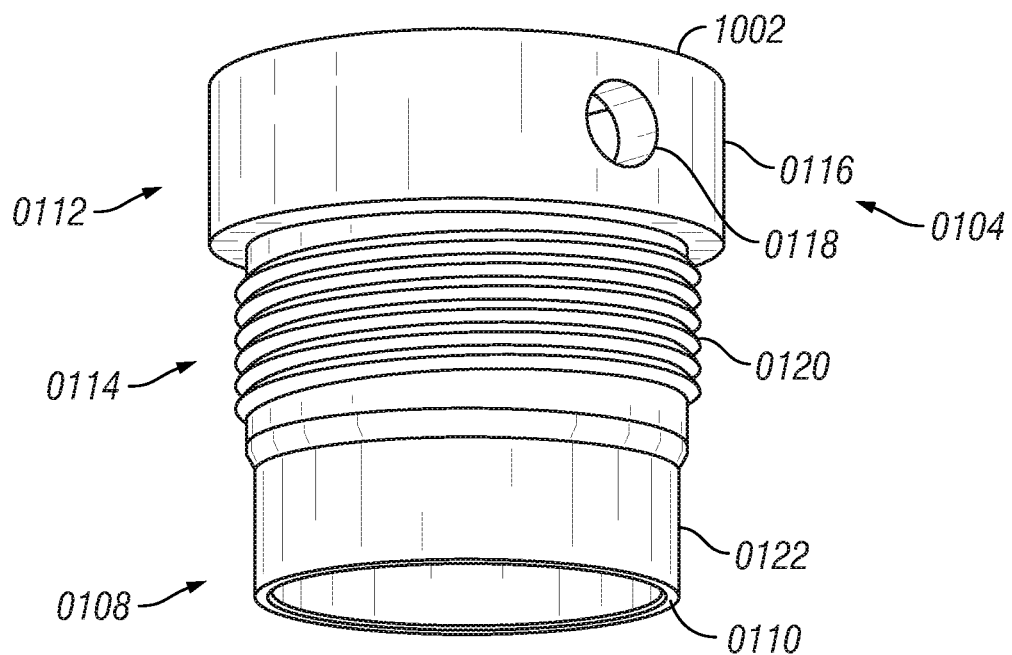
FIG. 23 is a perspective view taken from the front, the bottom and the left of a nubbin, which can be a component of an apparatus for guiding a gripping tool.
Figure 24:
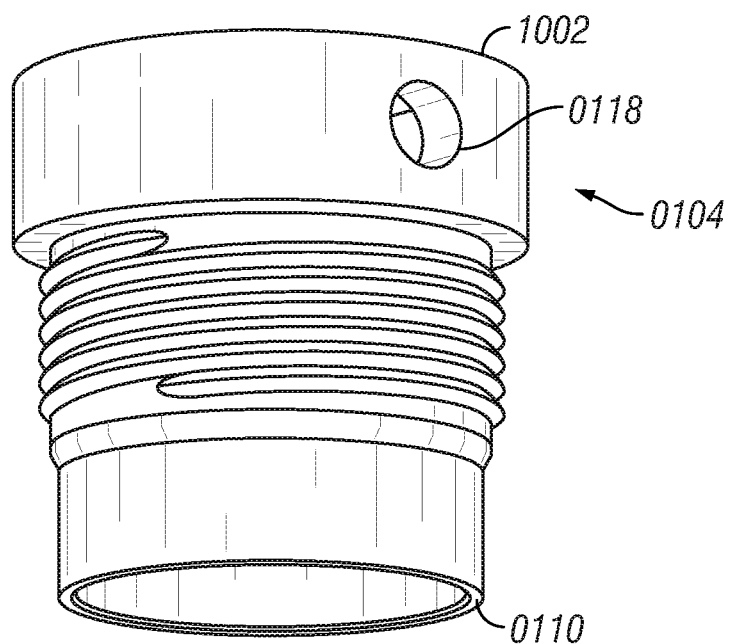
FIG. 24 is a perspective view taken from the rear, the bottom and the right of the nubbin of FIG. 23.
Figure 25:
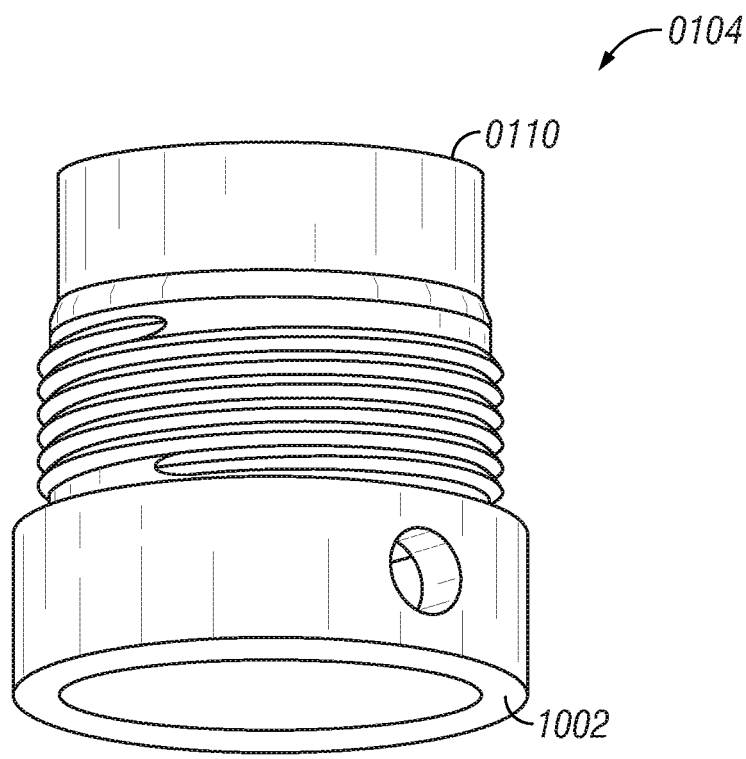
FIG. 25 a perspective view taken from the front, the top, and the right of the nubbin of FIG. 23.

Turning again to FIGS. 22 and 26 to 27, an embodiment of a method of using an apparatus 0102 is illustrated. The apparatus 0102 can be any apparatus described in this disclosure. As illustrated in FIGS. 22 and 26 to 27, the apparatus 0102 comprises a nubbin 0104 and a guide structure 0106 configured to be coupled to a nubbin 0104. In FIG. 22, the nubbin 0104 is shown as dashed since the dashed portion of the nubbin 0104 (in particular the nubbin collar) would not actually be visible from the outside of the target structure 1102 in the illustrated embodiment. The method comprises coupling the nubbin 0104 to a target structure 1102 to be gripped by a gripping tool 1104, coupling the guide structure 0106 to the nubbin 0104, and moving a leading portion 0110 of the gripping tool 1104 through the apparatus 0102 and into the target structure 1102. The coupling the nubbin to the target structure can occur before coupling the guide structure to the nubbin. Alternatively, coupling the guide structure to the nubbin can occur before coupling the nubbin to the target structure. As illustrated, the nubbin can be coupled to the target structure by engagement between the nubbin screw thread 0120 and the target screw thread 1106, which is shown as dashed since the target screw thread 1106 would not actually be visible from the outside of the target structure 1102.

With reference to FIGS. 26 to 27, the step of coupling the guide structure 0106 to the nubbin 0104 comprises several steps. A first step comprises positioning the guide collar 1200 around the nubbin collar 0116. A second step comprises aligning the first guide aperture 1202 with the first nubbin aperture 0118. A third step comprises aligning the second guide aperture 1202 with the second nubbin aperture 0118. The aligning steps can occur simultaneously so that the aligning steps are essentially a single aligning step. A fourth step comprises inserting the first pin 2602 through the first guide aperture 1202 and into the first nubbin aperture 0118 and rotating the first pin 2602 so that a first threaded outer pin surface of the first pin 2602 engages a first threaded inner aperture surface of the first aperture 1202. A fifth step comprises inserting the second pin 2602 through the second guide aperture 1202 and into the second nubbin aperture 0118 and rotating the second pin 2602 so that a second threaded outer pin surface of the second pin 2602 engages a second threaded inner aperture surface of the second aperture 1202. The inserting steps can occur simultaneously. It can be possible to couple the guide structure 0106 to the nubbin 0104 with a single pin; however, using two pins can provide a more secure coupling. Generally, the inserting step or steps occur after the aligning step or steps. Although, it is possible to partially screw a pin into the guide structure, next position the nubbin within the guide structure, then align the corresponding guide aperture and nubbin aperture, and subsequently screw the pin further into the guide aperture, thereby causing the pin to travel into the nubbin aperture as well. Further options are also possible as a skilled person would understand upon reading the present disclosure.

Additional Embodiments

The following clauses include descriptive embodiments that are offered as further support of the disclosed invention:

1. An apparatus 0102 for guiding a gripping tool 1104 into a target structure 1102 to be gripped, the apparatus 0102 comprising:

a guide structure 0106 coupled or fixed (e.g., permanently fixed, or reversibly coupled) to the nubbin 0104; and optionally a nubbin 0104;

the nubbin 0104 optionally comprising a proximal nubbin end 0110 configured to be adjacent to the target structure 1102 (optionally configured to be coupled, directly or indirectly, to the target structure 1102), a proximal nubbin portion 0108 adjacent to the proximal nubbin end 0110, a distal nubbin end 1002 opposite the proximal nubbin end 0110, and a distal nubbin portion 0112 adjacent to the distal nubbin end 1002; the nubbin 0104, the proximal nubbin end 0110, the proximal nubbin portion 0108, the distal nubbin portion 0112, or any combination thereof comprising a nubbin coupling 0114 or couplings (e.g., nubbin inner screw threads 0120 or nubbin outer screw threads 0120, component configured to mate with the target coupling, a bolt, bolts, a magnetic material, magnetic materials, a magnet, magnets or any combination thereof) configured to be coupled (e.g., directly or indirectly) to the target structure 1102 (e.g., a target coupling comprising target outer screw threads, target inner screw threads, a magnetic material or a magnet configured to engage the nubbin coupling 0114);

the guide structure 0106 comprising a proximal guide end 0302 adjacent to the nubbin 0104, a proximal guide portion 0304 adjacent to the proximal guide end 0302, a distal guide end 0308 opposite the proximal guide end 0302, a distal guide portion 0306 adjacent to the distal guide end 0308, and an inner void (e.g., conduit) having a cross-sectional dimension 0310 (e.g., diameter or other dimension perpendicular to a central axis of the guide structure 0106, a central axis 0402 of the nubbin 0104 or both) that increases (e.g., gradually increases, smoothly increases, or both) from the proximal guide end 0302 to the distal guide end 0308, the proximal guide portion 0304 being coupled or fixed (e.g., permanently or reversibly fixed, or permanently or reversibly coupled) to the distal nubbin portion 0112;

optionally the nubbin 0104 comprises a nubbin collar 0116 (e.g., cylindrical collar, collar protruding outwardly from the nubbin 0104, collar with a larger outer diameter than other portions of the nubbin 0104, collar with a larger outer diameter than all other portions of the nubbin 0104 or any combination thereof), optionally the distal nubbin portion 0112 comprises the nubbin collar 0116, optionally the nubbin collar 0116 is located adjacent to the distal nubbin end 1002, optionally the nubbin 0104 or the nubbin collar 0116 comprises a plurality of collar apertures 0118 configured to receive a rod, optionally the plurality of apertures comprise a first collar aperture 0118 and a second collar aperture 0118 which is optionally opposite the first collar aperture, optionally the first collar aperture 0118 and the second collar aperture 0118 configured so that a rod (e.g., straight rod, cylindrical rod, rod long enough to extend through both the first collar aperture 0118 and the second collar aperture 0118 simultaneously, or a combination thereof) can pass through or be inserted into both the first collar aperture 0118 and the second collar aperture simultaneously, optionally the first collar aperture 0118 and the second collar aperture 0118 are cylindrical, optionally the central axis of the first collar aperture 0118 and the central axis of the second collar aperture 0118 are within 15, 10, 5, 4, 3, 2 or 1 degrees of perpendicular to the central axis 0402 of the nubbin 0104;

optionally the nubbin 0104 comprises an external screw thread 0120, optionally the external screw thread 0120 is located between the nubbin collar 0116 and the proximal nubbin end 0110;

optionally the nubbin 0104 comprises a non-threaded outer surface 0122 (e.g., round outer surface, or somewhat cylindrical outer surface) without screw thread, optionally the non-threaded outer surface 0122 is located between an external screw thread 0120 of the nubbin 0104 and the proximal nubbin end 0110, optionally the non-threaded outer surface 0122 has an outer dimension (e.g., diameter or optionally largest dimension perpendicular to the central axis 0402 of the nubbin 0104 for non-threaded outer surfaces 0122 having shapes with non-circular cross-sections) that is smaller than the outer dimension (e.g. diameter) of the external screw thread 0120; and optionally the guide structure 0106 has a truncated conical shape, a bell shape or a hemispherical shape, optionally the inner surface of the guide structure 0106 has a truncated conical shape, a bell shape or a hemispherical shape.

2. An apparatus for guiding a gripping tool into a target structure to be gripped, the apparatus comprising:

a guide structure configured to be fixed to a nubbin;

optionally the nubbin comprising a proximal nubbin end configured to be adjacent to the target structure, a proximal nubbin portion adjacent to the proximal nubbin end, a distal nubbin end opposite the proximal nubbin end, and a distal nubbin portion adjacent to the distal nubbin end;

optionally the proximal nubbin portion comprising a nubbin coupling configured to be coupled to the target structure;

optionally the distal nubbin portion comprising a nubbin collar, the nubbin collar comprising a first nubbin aperture and a second nubbin aperture which is optionally opposite the first nubbin aperture;

optionally the guide structure comprising a proximal guide end configured to be adjacent to the nubbin, a proximal guide portion adjacent to the proximal guide end, a distal guide end opposite the proximal guide end, and an inner void having a cross-sectional dimension that increases from the proximal guide end to the distal guide end, optionally the proximal guide portion being configured to be fixed to the distal nubbin portion;

optionally wherein the proximal guide portion of the guide structure comprises a guide collar, the guide collar configured to receive the nubbin collar of the nubbin; and optionally wherein the guide collar comprises a first guide aperture and a second guide aperture which is optionally opposite the first guide aperture, optionally the first guide aperture and the second guide aperture each being configured to receive a cylindrical rod that passes through both the first guide aperture and the second guide aperture.

3. The apparatus of any preceding clause:

wherein the apparatus comprises a first pin configured to be inserted into the first guide aperture, the first pin configured to protrude past the first guide aperture and into a first nubbin aperture of a nubbin (e.g., nubbin collar) positioned inside the guide collar;

wherein the first guide aperture comprises a first threaded inner aperture surface;

wherein the first pin comprises a first leading end, a first leading portion adjacent to the first leading end, a first trailing end, and a first trailing portion positioned between the first leading portion and the first trailing end, the first pin configured to be inserted into the first guide aperture, the first leading end configured to be inserted into the first guide aperture before any other portion of the first pin, and the first trailing portion comprising a first threaded outer pin surface;

wherein the first pin comprises a first rotator engagement portion (e.g., recess configured to be rotated by a driver, a recess configured to receive a screw driver head or drill bit head, a protrusion configured to be rotated by a driver, a structure with a polygonal cross-section configured to be rotated by a driver, for example a hex head protrusion or hexagonally shaped recess, or any combination thereof), the first rotator engagement portion configured to permit the first pin to be rotated so that the first threaded outer pin surface engages the first threaded inner aperture surface (e.g., so the first pin can be screwed into the first guide aperture);

wherein the first leading portion of the first pin comprises a non-threaded outer pin surface configured to be inserted into the first nubbin aperture of the nubbin;

wherein the apparatus comprises a second pin configured to be inserted into the second guide aperture, the second pin configured to protrude past the second guide aperture and into a second nubbin aperture of the nubbin (e.g., nubbin collar) positioned inside the guide collar;

wherein the second guide aperture comprises a second threaded inner aperture surface;

wherein the second pin comprises a second leading end, a second leading portion adjacent to the second leading end, a second trailing end, and a second trailing portion positioned between the second leading portion and the second trailing end, the second pin configured to be inserted into the second guide aperture, the second leading end configured to be inserted into the second guide aperture before any other portion of the second pin, and the second trailing portion comprising a second threaded outer pin surface;

wherein the second pin comprises a second rotator engagement portion (e.g., recess configured to be rotated by a driver, a recess configured to receive a screw driver head or drill bit head, a protrusion configured to be rotated by a driver, a structure with a polygonal cross-section configured to be rotated by a driver, for example a hex head protrusion or hexagonally shaped recess, or any combination thereof), the second rotator engagement portion configured to permit the second pin to be rotated so that the second threaded outer pin surface engages the second threaded inner aperture surface (e.g., so the second pin can be screwed into the second guide aperture);

wherein the second leading portion of the second pin comprises a non-threaded outer pin surface configured to be inserted into the second nubbin aperture of the nubbin;

wherein a distal guide portion of the guide structure has a truncated conical shape;

wherein the guide structure is configured so that when the central axis of the nubbin is oriented vertically, an inner surface of the truncated conical shape is oriented at an angle of 20-40 degrees above horizontal;

wherein the guide collar has an inner diameter equal to 10 and ⅝ inches +/−5 inches;

wherein the guide collar has an outer diameter equal to 12 and ⅝ inches +/−5 inches;

wherein the distal guide end has an inner diameter equal to 16 and ⅝ inches +/−5 inches;

wherein the distal guide end has an outer diameter equal to 18 and ⅝ inches +/−5 inches;

wherein the guide structure comprises aluminium;

wherein the apparatus comprises the nubbin;

wherein the nubbin has an inner diameter equal to 8 and ⅝ inches +/−5 inches;

wherein the nubbin has an outer diameter equal to 10 and ⅝ inches +/−5 inches;

wherein a nubbin aperture (e.g., the first nubbin aperture, the second nubbin aperture, a plurality of nubbin apertures, nubbin apertures in the nubbin collar, or a combination thereof) have a diameter of 1 inch +/−0.5, 0.4, 0.3, 0.2, or 0.1 inches;

wherein a guide aperture (e.g., the first guide aperture, the second guide aperture, a plurality of guide apertures, guide apertures in the guide collar, or a combination thereof) have a diameter of 1 inch +/−0.5, 0.4, 0.3, 0.2, or 0.1 inches;

wherein a pin (e.g., the first pin, the second pin, a plurality of pins, a portion of the pin, a leading portion of the pin, a trailing portion of the pin, or a combination thereof) have a diameter of 1 inch +/−0.5, 0.4, 0.3, 0.2, or 0.1 inches;

or any combination thereof.

4. The apparatus 0102 of any preceding clause, wherein:

optionally the guide structure 0106 is configured so that when the central axis 0402 of the nubbin 0104 is oriented vertically, an inner surface of the truncated conical shape is oriented at an angle of 30 degrees +/−15, 10, 9, 8, 7, 6, 5, 4, 3, 2, or 1 degrees above horizontal; optionally the guide structure 0106 is configured so that when the central axis 0402 of the nubbin 0104 is oriented vertically, an inner surface of the truncated conical shape is oriented at an angle of 25 degrees +/−15, 10, 9, 8, 7, 6, 5, 4, 3, 2, or 1 degrees above horizontal.

5. The apparatus 0102 of any preceding clause, wherein:

optionally the nubbin 0104 has an inner diameter equal to 8 and ⅝ inches +/−5, 4, 3, 2, 1, ⅘, ⅜, ⅔ or ⅛ inches; optionally the nubbin 0104 has an inner diameter equal to 9 and ⅝ inches +/−5, 4, 3, 2, 1, ⅘, ⅜, ⅔ or ⅛ inches; optionally the nubbin 0104 has an inner diameter equal to 10 and ⅝ inches +/−5, 4, 3, 2, 1, ⅘, ⅜, ⅔ or ⅛ inches; optionally the nubbin 0104 has an inner diameter equal to 11 and ⅝ inches +/−5, 4, 3, 2, 1, ⅘, ⅜, ⅔ or ⅛ inches;

optionally the nubbin 0104 has an outer diameter equal to 10 and ⅝ inches +/−5, 4, 3, 2, 1, ⅘, ⅜, ⅔ or ⅛ inches; optionally the nubbin 0104 has an outer diameter equal to 11 and ⅝ inches +/−5, 4, 3, 2, 1, ⅘, ⅜, ⅔ or ⅛ inches; optionally the nubbin 0104 has an outer diameter equal to 12 and ⅝ inches +/−5, 4, 3, 2, 1, ⅘, ⅜, ⅔ or ⅛ inches; optionally the nubbin 0104 has an outer diameter equal to 13 and ⅝ inches +/−5, 4, 3, 2, 1, ⅘, ⅜, ⅔ or ⅛ inches;

optionally the proximal guide end 0302 has an inner diameter equal to 10 and ⅝ inches +/−5, 4, 3, 2, 1, ⅘, ⅜, ⅔ or ⅛ inches; optionally the proximal guide end 0302 has an inner diameter equal to 11 and ⅝ inches +/−5, 4, 3, 2, 1, ⅘, ⅜, ⅔ or ⅛ inches; optionally the distal guide end 0308 has an inner diameter of 16 and ⅝ inches +/−5, 4, 3, 2, 1, ⅘, ⅜, ⅔ or ⅛ inches; optionally the distal guide end 0308 has an inner diameter of 17 and ⅝ inches +/−5, 4, 3, 2, 1, ⅘, ⅜, ⅔ or ⅛ inches; and optionally the proximal guide end 0302 has an outer diameter equal to 12 and ⅝ inches +/−5, 4, 3, 2, 1, ⅘, ⅜, ⅔ or ⅛ inches; optionally the proximal guide end 0302 has an outer diameter equal to 13 and ⅝ inches +/−5, 4, 3, 2, 1, ⅘, ⅜, ⅔ or ⅛ inches; optionally the distal guide end 0308 has an outer diameter of 18 and ⅝ inches +/−5, 4, 3, 2, 1, ⅘, ⅜, ⅔ or ⅛ inches; optionally the distal guide end 0308 has an outer diameter of 19 and ⅝ inches +/−5, 4, 3, 2, 1, ⅘, ⅜, ⅔ or ⅛ inches.

6. The apparatus 0102 of any preceding clause, wherein:

optionally the length 1004 of the nubbin 0104, as measured along the central axis 0402 of the nubbin 0104, is 6 and ⅝ inches +/−5, 4, 3, 2, 1, ⅘, ⅜, ⅔ or ⅛ inches; and optionally the length 1006 of the guide structure 0106, as measured along the central axis 0402 of the nubbin 0104, is 1 and ⅜ inches +/−1, ⅘, ⅜, ⅔ or ⅛ inches.

7. The apparatus 0102 of any preceding clause, wherein the apparatus 0102 comprises a first material and a second material;

optionally wherein the nubbin 0104 comprises, consists essentially of or consists of the first material, the second material or a combination thereof;

optionally wherein the guide structure 0106 comprises, consists essentially or consists of the first material, the second material or a combination thereof;

optionally wherein the first material is more dense than the second material;

optionally wherein the first material is configured to be rigid;

optionally wherein the second material is configured to be rigid;

optionally wherein the first material is metal (e.g., a metal alloy, steel, stainless steel, carbon steel, aluminium, or any combination thereof), polymer, rubber, plastic, thermoplastic, polyurethane or any combination thereof; and optionally wherein the second material is metal (e.g., a metal alloy, steel, stainless steel, carbon steel, aluminium or any combination thereof), polymer, rubber, plastic, thermoplastic, polyurethane or any combination thereof; optionally wherein the second material has a density equal to no more than 2,710 kg/m^3, a density of no more than 1.5, 1.4, 1.3, 1.2, or 1.1 times 2,710 kg/m^3, a density of at least 0.5, 0.6, 0.7, 0.8 or 0.9 times 2,710 kg/m^3, a density of around 0.5 to 1.5 times 2,710 kg/m^3, or any combination thereof.

8. A system comprising the apparatus 0102 of any preceding clause:

optionally the system comprising the target structure 1102;

optionally the system comprising the gripping tool 1104;

optionally the system comprising a cylindrical rod (e.g., having a length long enough to pass through both a first aperture 0118 and a second aperture 0118 positioned opposite the first aperture on the nubbin or the nubbin collar 0116); and optionally the system comprising any component or any combination of components described in this disclosure.

9. A method of using an apparatus 0102 (e.g., for guiding a gripping tool 1104 into a target structure 1102 to be gripped (e.g., a tubular structure, pipe or casing, which can optionally be used to drill a wellbore)), wherein the apparatus 0102 comprises a nubbin 0104 and a guide structure 0106 coupled to the nubbin 0104.

10. A method of using an apparatus (e.g., for guiding a gripping tool 1104 into a target structure 1102 to be gripped (e.g., a tubular structure, pipe or casing, which can optionally be used to drill a wellbore)), wherein the apparatus comprises a nubbin and a guide structure configured to be coupled to a nubbin.

11. The method of any preceding clause, the method comprising:

coupling the nubbin to a target structure to be gripped by a gripping tool;

coupling the guide structure to the nubbin;

moving a leading portion of the gripping tool through the apparatus and into the target structure;

wherein the moving step comprises moving the leading portion of the gripping tool from a first position outside the guide structure to a second position inside the guide structure, from the second position inside the guide structure to a third position inside the nubbin, from the third position inside the nubbin to a fourth position inside the target structure;

wherein the apparatus comprises the nubbin and the guide structure, the guide structure configured to be fixed to the nubbin;

wherein the nubbin comprises a proximal nubbin end configured to be adjacent to the target structure, a proximal nubbin portion adjacent to the proximal nubbin end, a distal nubbin end opposite the proximal nubbin end, and a distal nubbin portion adjacent to the distal nubbin end;

wherein the proximal nubbin portion comprises a nubbin coupling configured to be coupled to the target structure;

wherein the distal nubbin portion comprises a nubbin collar, the nubbin collar comprising a first nubbin aperture and a second nubbin aperture which is optionally opposite the first nubbin aperture; the guide structure comprising a proximal guide end adjacent to the nubbin, a proximal guide portion adjacent to the proximal guide end, a distal guide end opposite the proximal guide end, a distal guide portion adjacent to the distal guide end, an inner void having a cross-sectional dimension that increases from the proximal guide end to the distal guide end or any combination thereof;

wherein the proximal guide portion is configured to be coupled to the distal nubbin portion;

wherein the proximal guide portion of the guide structure comprises a guide collar, the guide collar configured to receive the nubbin collar of the nubbin;

wherein the guide collar comprises a first guide aperture and a second guide aperture which is optionally opposite the first guide aperture, optionally the first guide aperture and the second guide aperture each being configured to receive a cylindrical rod that passes through both the first guide aperture and the second guide aperture;

wherein the target structure comprises a tubular located at a site for drilling a wellbore;

wherein the target structure comprises a pipe or casing;

wherein the coupling the guide structure to the nubbin comprises:

(1) positioning the guide collar around the nubbin collar;

(2) aligning the first guide aperture with the first nubbin aperture;

(3) aligning the second guide aperture with the second nubbin aperture;

(4) inserting the first pin through the first guide aperture and into the first nubbin aperture and rotating the first pin so that a first threaded outer pin surface of the first pin engages a first threaded inner aperture surface of the first aperture;

(5) inserting the second pin through the second guide aperture and into the second nubbin aperture and rotating the second pin so that a second threaded outer pin surface of the second pin engages a second threaded inner aperture surface of the second aperture; or (6) any combination thereof;

wherein the apparatus is the apparatus of any preceding clause;

wherein the system of any preceding clause comprises the apparatus of any preceding clause;

or any combination thereof.

12. The method of any preceding clause, the method comprising:

optionally coupling the nubbin 0104 to a target structure 1102 (e.g., tubular structure, tubular structures, tubular, tubulars, pipe, pipes, casing, or any combination thereof) to be gripped by a gripping tool 1104 (e.g., by using a nubbin screw thread 0120 on an interior of the nubbin 0104 to couple to a target screw thread 1106 on the exterior of the target structure 1102, or by using a nubbin screw thread 0120 on an exterior of the nubbin 0104 to connect to a target screw thread 1106 on the interior of the target structure 1102, optionally wherein the target structure 1102 comprises a plurality of structures 1108 that have been coupled in series to form a continuous void inside the plurality of structures 1108);

optionally moving a leading portion 1110 of the gripping tool 1104 through the apparatus 0102 and into the target structure 1102, optionally from a first position outside the guide structure 0106 to a second position inside the guide structure 0106, from the second position inside the guide structure 0106 to a third position inside the nubbin 0104, from the third position inside the nubbin 0104 to a fourth position inside the target structure 1102;

optionally wherein the apparatus 0102 is the apparatus 0102 of any preceding clause;

optionally wherein the system of any preceding clause comprises the apparatus 0102 of any preceding clause;

optionally wherein the target structure 1102 comprises a tubular or plurality of tubulars (e.g., interconnected tubulars) located at a site for drilling a wellbore; and optionally wherein the target structure 1102 comprises a pipe or casing.

Although embodiments have been described in this disclosure, including for example the drawings, using a nubbin 0104 and a guide structure 0106 with specific shapes, the nubbin 0104 and guide structure 0106 are not limited to these respective shapes. For example, in some embodiments the edges, intersections and surfaces of any component or structure described herein can be can be planar, rounded, chamfered, at right angles, non-planar, not rounded, not chamfered, not at right angles or a combination thereof.

Although embodiments have been described in this disclosure, including for example the drawings, using an apparatus 0102 that is a single continuous structure, the apparatus 0102 can instead be made of separate components that are combined (e.g., fixed, either permanently or reversibly, or coupled, either permanently or reversibly). For example, although the guide structure 0106 is illustrated as forming a single continuous structure with the nubbin 0104, the guide structure 0106 can be combined (e.g., fixed, either permanently or reversibly, or coupled, either permanently or reversibly) with the nubbin 0104 in various ways.

Although embodiments have been described in this disclosure, including for example the drawings, using specific dimensions and angles, in other embodiments, any dimension or selection of dimensions can be changed (either increased or decreased in size) by multiplying the dimension by any factor and any other dimension or dimensions can remain the same. In some embodiments, the factor can be 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0. In some embodiments, the invention can be stretched or shrunk proportionally parallel to or perpendicular to the central axis 0402 of the nubbin 0104 or the guide structure 0106 or both. In some embodiments, as illustrated in FIG. 1, the central axis 0402 of the nubbin 0104 and the central axis of the guide structure 0106 can be concentric.

Although embodiments have been described using the word "comprising," additional embodiments can be created by replacing the word "comprising" with "consisting essentially of" or "consisting of" Additional embodiments can be created by replacing the word "comprising," with comprising 1, 2, 3, 4, 5, 10, 20, 30, 40, 50, 60, 70, 80, 90, 95, 96, 97, 98, or 99 wt. % and up to 100 wt. % of the component described.

Although embodiments have been described using the term "fixed," "coupled" or conjugates thereof, additional embodiments can be created by replacing either term or conjugates thereof with "fixed," "permanently fixed," "reversibly fixed," "coupled," "permanently coupled," "reversibly coupled," combinations thereof or conjugates thereof. Examples of fixing include fixing components relative to each other in position (e.g., relative distance between adjacent outer surfaces of the components or relative distance between the centers of mass for the components, or any combination thereof), orientation, arrangement, connectivity or any combination thereof. Examples of coupled include fixedly coupled, non-fixedly coupled, adhered, rotatably coupled, screwed together, mated, slidably coupled, snapped together, bolted together, or other options for connecting two structures.

Although embodiments have been described using a first range with a first set of end points, additional embodiments can be created by replacing the first range with a narrower range whose endpoints are selected from any value contained in the first range.

Although embodiments have been described using a specific direction relative to a reference direction, additional embodiments can be created by indicating that the specific direction can vary from the reference direction by no more than 45, 40, 35, 30, 25, 20, 15, 10, 5, 4, 3, 2 or 1 degrees.

Although embodiments have been described using a specific angle, additional embodiments can be created by indicating that the specific angle can vary from the reference direction by no more than 45, 40, 35, 30, 25, 20, 15, 10, 5, 4, 3, 2 or 1 degrees. Additionally, the angle of the walls of the guide structure 0106 to the central axis of the guide structure can change by +/−15, 10, 9, 8, 7, 6, 5, 4, 3, 2 or 1 degrees from any value described in this disclosure.

Although embodiments have been described using specific dimensions, in additional embodiments, the dimensions can be different. For example, the dimensions of the apparatus can be shrunken or enlarged. To illustrate, additional embodiments can be formed by changing the length along the central axis, the inner diameter of the nubbin 0104 at any given point or any selection of points, the outer diameter of the nubbin at any given point or any selection of points, the inner diameter of the guide structure 0106 (e.g., guide collar) at any given point or any selection of points, or the outer diameter of the guide structure (e.g., guide collar) at any given point or any selection of points, or any combination thereof can vary by +/−50, 45, 40, 35, 30, 25, 20, 15, 10, or 5, 4, 3, 2 or 1% of the values described in this disclosure.

Some embodiments have been described using optional elements. One of the optional elements, a selection of any of the optional elements, or all of the optional elements can be included in an embodiment, but inclusion of the optional elements in the embodiment is not required. Additionally, any combination of the optional elements can be included in the embodiment.

Although the apparatus has been illustrated as comprising a nubbin 0104 that can be coupled to a target structure 1102, pipe, casing or tubular using a threaded coupling, in some embodiments, the apparatus or nubbin 0104 can be coupled to a target structure 1102, pipe, casing or tubular using magnetic attraction. For example, the apparatus can exclude a nubbin 0104 and can instead comprise a different structure with a magnetic coupling configured to be coupled to a target structure 1102, pipe, casing or tubular using magnetic attraction. As another example, the apparatus can comprise a nubbin 0104 that is configured to be coupled to a target structure 1102, pipe, casing or tubular using magnetic attraction. For example, the nubbin 0104 can comprise a magnet that is configured to be coupled to a target structure 1102, pipe, casing or tubular using magnetic attraction.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An apparatus for guiding a gripping tool into a target structure to be gripped, the apparatus comprising a guide structure and a nubbin;

wherein the guide structure is configured to be fixed to the nubbin; the nubbin comprising an inner bore, a proximal nubbin end configured to be adjacent to the target structure, a proximal nubbin portion adjacent to the proximal nubbin end, a distal nubbin end opposite the proximal nubbin end, and a distal nubbin portion adjacent to the distal nubbin end; the proximal nubbin portion comprising a nubbin coupling configured to be coupled to the target structure; the distal nubbin portion comprising a nubbin collar, the nubbin collar protruding outwardly from an adjacent surface of the nubbin, the adjacent surface of the nubbin being located between the nubbin collar and the proximal nubbin end, the nubbin collar comprising a first nubbin aperture and a second nubbin aperture opposite the first nubbin aperture;

wherein the nubbin coupling comprises nubbin outer screw threads configured to connect with a box end of a tubular;

wherein the inner bore extends from the proximal nubbin end to the distal nubbin end and the totality of the inner bore of the nubbin is free of threads;

wherein the guide structure comprises a proximal guide end configured to be adjacent to the nubbin collar, a proximal guide portion adjacent to the proximal guide end, a distal guide end opposite the proximal guide end, and an inner void having a cross-sectional dimension that increases from the proximal guide end to the distal guide end, the cross-sectional dimension being measured perpendicular to a central axis of the nubbin, the proximal guide portion being configured to be fixed to the distal nubbin portion;

wherein the proximal guide portion of the guide structure comprises a guide collar, the guide collar configured to receive the nubbin collar of the nubbin; and wherein the guide collar comprises a first guide aperture and a second guide aperture opposite the first guide aperture, the first guide aperture and the second guide aperture each being configured to receive a cylindrical rod that passes through both the first guide aperture and the second guide aperture.

2. The apparatus of claim 1, wherein the apparatus comprises a first pin configured to be inserted into the first guide aperture, the first pin configured to protrude past the first guide aperture and into the first nubbin aperture of as the nubbin collar of the nubbin, the nubbin collar positioned inside the guide collar.

3. The apparatus of claim 2, wherein the first guide aperture comprises a first threaded inner aperture surface.

4. The apparatus of claim 3, wherein the first pin comprises a first leading end, a first leading portion adjacent to the first leading end, a first trailing end, and a first trailing portion positioned between the first leading portion and the first trailing end, the first pin configured to be inserted into the first guide aperture, the first leading end configured to be inserted into the first guide aperture before any other portion of the first pin, and the first trailing portion comprising a first threaded outer pin surface.

5. The apparatus of any of claim 4, wherein the first pin comprises a first rotator engagement portion, the first rotator engagement portion configured to permit the first pin to be rotated so that the first threaded outer pin surface engages the first threaded inner aperture surface.

6. The apparatus of claim 5, wherein the first leading portion of the first pin comprises a non-threaded outer pin surface configured to be inserted into the first nubbin aperture of the nubbin.

7. The apparatus of claim 6, wherein the apparatus comprises a second pin configured to be inserted into the second guide aperture, the second pin configured to protrude past the second guide aperture and into the second nubbin aperture of the nubbin collar of the nubbin, the nubbin collar being positioned inside the guide collar.

8. The apparatus of claim 7, wherein the second guide aperture comprises a second threaded inner aperture surface.

9. The apparatus of claim 8, wherein the second pin comprises a second leading end, a second leading portion adjacent to the second leading end, a second trailing end, and a second trailing portion positioned between the second leading portion and the second trailing end, the second pin configured to be inserted into the second guide aperture, the second leading end configured to be inserted into the second guide aperture before any other portion of the second pin, and the second trailing portion comprising a second threaded outer pin surface.

10. The apparatus of any of claim 9, wherein the second pin comprises a second rotator engagement portion, the second rotator engagement portion configured to permit the second pin to be rotated so that the second threaded outer pin surface engages the second threaded inner aperture surface.

11. The apparatus of claim 10, wherein the second leading portion of the second pin comprises a non-threaded outer pin surface configured to be inserted into the second nubbin aperture of the nubbin.

12. The apparatus of claim 1, wherein a distal guide portion of the guide structure has a truncated conical shape.

13. The apparatus of claim 1, wherein the guide structure comprises aluminum.

14. The apparatus of claim 1, wherein the apparatus comprises a first pin configured to be inserted into the first guide aperture, the first pin configured to protrude past the first guide aperture and into the first nubbin aperture of the nubbin collar of the nubbin, the nubbin collar positioned inside the guide collar and wherein a first leading portion of the first pin comprises a non-threaded outer pin surface configured to be inserted into the first nubbin aperture of the nubbin.

15. The apparatus of claim 14, wherein the first nubbin aperture has a diameter of 1+/−0.5 inches.

16. The apparatus of claim 14, wherein an inner surface of the guide collar is unthreaded and configured to allow the guide collar to slide along the nubbin collar.

17. The apparatus of claim 1, wherein an inner surface of the guide collar is unthreaded and configured to allow the guide collar to slide along the nubbin collar.

18. The apparatus of claim 1, wherein the cross-sectional dimension of the inner void at the distal guide end is larger than an inner diameter of the guide collar.

19. A system comprising:
the apparatus of claim 1;
and
the target structure.